US006714194B1

(12) United States Patent
Sander

(10) Patent No.: US 6,714,194 B1
(45) Date of Patent: Mar. 30, 2004

(54) IMPLEMENTING STACK EXTENSION IN A MODIFIER STACK

(75) Inventor: Nikolai Sander, Mill Valley, CA (US)

(73) Assignee: Autodesk, Inc., San Rafael, CA (US)

( * ) Notice: Subject to any disclaimer, the term of this patent is extended or adjusted under 35 U.S.C. 154(b) by 346 days.

(21) Appl. No.: 09/935,180

(22) Filed: Aug. 21, 2001

Related U.S. Application Data

(60) Provisional application No. 60/293,109, filed on May 22, 2001, and provisional application No. 60/291,947, filed on May 18, 2001.

(51) Int. Cl.[7] .............................................. G06T 17/00
(52) U.S. Cl. ...................... 345/420; 345/423; 345/606; 345/643
(58) Field of Search ................................ 345/420, 423, 345/606, 643

(56) References Cited

PUBLICATIONS

Andrew Clayton and Nancy Fulton. 3D Studio Max Applied. Advanstar Communications, 1996, pp. 313–315.*
SGI—Products, entitled OpenGL Shader Overview dated Dec. 1, 2001, (2 pgs) http://www.sig.com/software/shader/overview.html.
GameDev.net, entitled "Shader Programming Part I: Fundamentals of Vertex Shaders", by Wolfgang Engel, dated Sep. 18, 2001, (32 pgs) http://www.gamedev.net/reference/articles/article1496.asp.
Maya, entitled "Maya Hardware Shader White Paper", ©2001, Alias|Wavefront, dated Sep., 2001, (21 pgs).

* cited by examiner

*Primary Examiner*—Mark Zimmerman
*Assistant Examiner*—Adam Arnold
(74) *Attorney, Agent, or Firm*—Craig G. Holmes; Hickman Palermo Truong & Becker LLP

(57) ABSTRACT

A method and apparatus for implementing stack extensions in a modifier stack that is associated with a plurality of components that are sequentially applied to a geometry object when the modifier stack is evaluated. According to one aspect of the invention, an extension channel object is attached to the geometry object. The extension channel object is associated with a notification mechanism that notifies the extension channel object if a particular event occurs while the modifier stack is being evaluating. In response to receiving a notification that one of the plurality of components has caused a particular event to occur while the modifier stack is being evaluated, the extension channel object influences how the geometry object is modified by the component within the modifier stack.

62 Claims, 18 Drawing Sheets

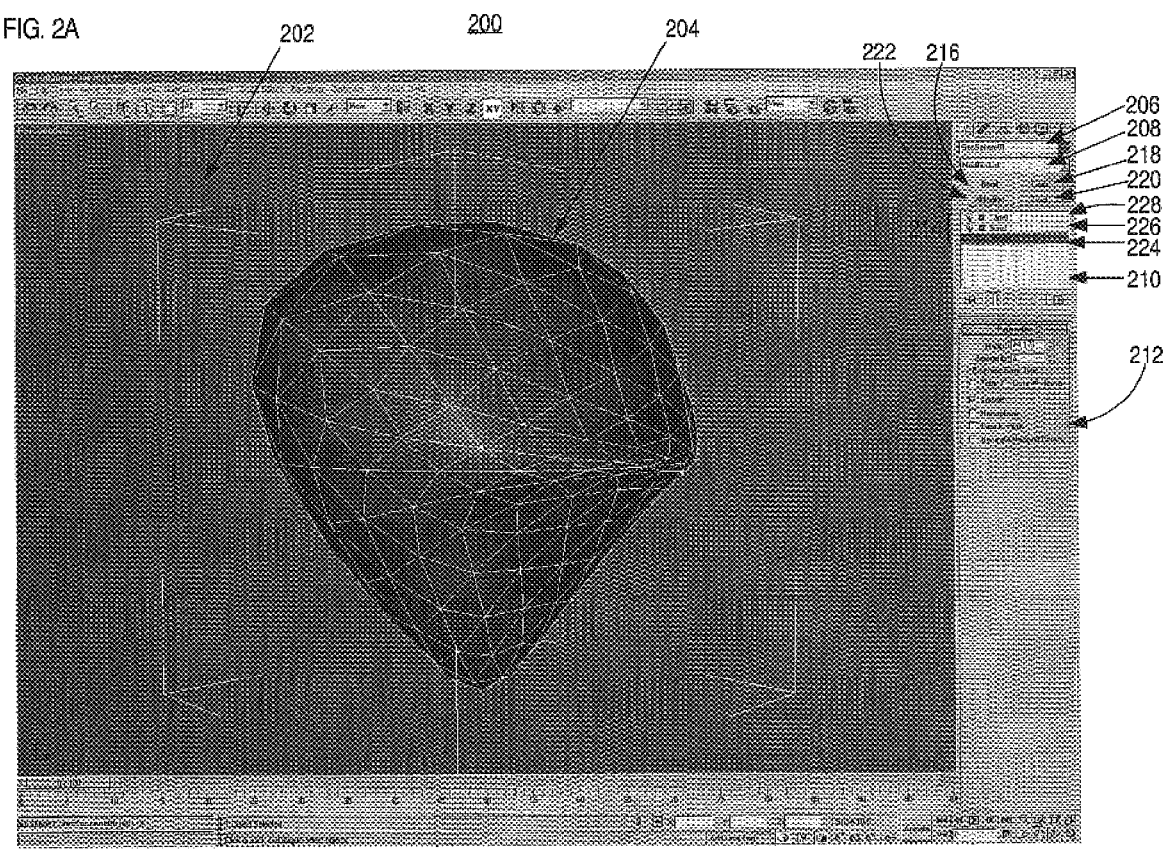

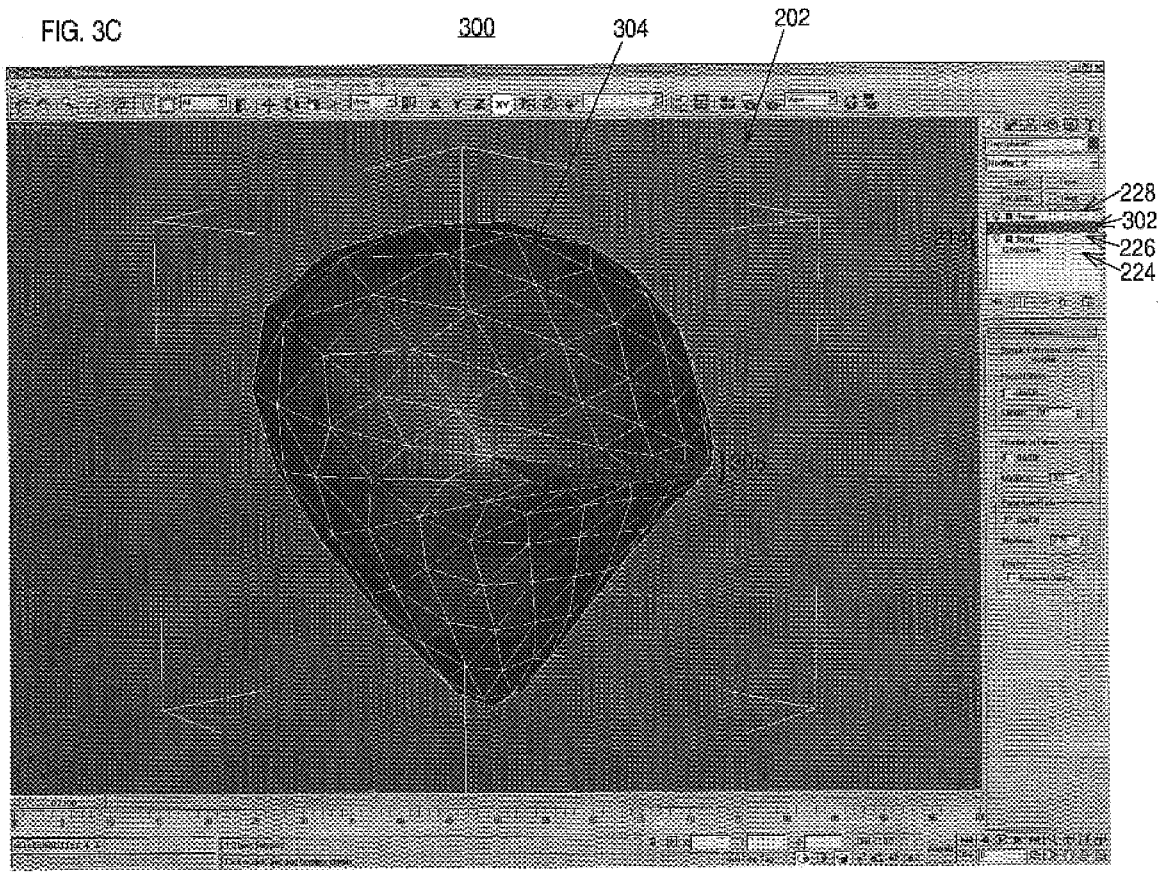

IMPLEMENTING STACK EXTENSION IN A MODIFIER STACK

CLAIM OF PRIORITY

This application claims priority from prior U.S. Provisional Patent Application Serial No. 60/291,947, filed on May 18, 2001, entitled "CONTENT LAYOUT AND DESIGN MECHANISM" naming as inventors Nikolai Sander, Scott Morrison, Britt Miura, Kells Elmquist, John Wainwright, Michael Malone, Frank Delise, Atilla Szabo, and Norbert Alan Jeske; and from prior U.S. Provisional Patent Application Serial No. 60/293,109, filed on May 22, 2001, entitled "A MECHANISM FOR CONTENT AND DESIGN LAYOUT," naming as inventors Nikolai Sander, Scott Morrison, Britt Miura, Kells Elmquist, John Wainwright, Michael Malone, Frank Delise, Atilla Szabo, and Norbert Alan Jeske, the entire disclosures of which are hereby incorporated by reference in their entirety for all purposes herein.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to computer graphics, and more specifically, to implementing stack extensions in a computer graphics application.

BACKGROUND OF THE INVENTION

Computer generated 3-D modeling and animation enrich a wide range of human experiences that includes everything from captivating audiences at the movie theaters, to gluing gamers to their video games, to embarking home buyers on virtual tours of new homes. To generate 3-D models and/or animations, a 3-D designer interacts with a 3-D modeling program, such 3D Studio Max™, which is commercially available from Autodesk, Inc., to define objects for importing into a computer graphic application, such as a game engine. As part of creating an object, the designer typically defines a base object, for example a sphere or box, and then applies one or more modifiers to the base object to create a rendered object that can then be exported into a graphic application.

For example, to create an object, an animator ("user") may interact with a conventional modeling and/or animation program to define a base object by selecting a particular base object type from a set of predefined object types and by entering and/or selecting a set of parameter values that are to be used to define the specific characteristics of the base object. Next, using the modeling program, the user may define one or more modifiers that are to be applied to the base object for modifying certain characteristics and/or attributes of the base object. Thereafter, once the user is satisfied with the generated object, the object can then be exported for use in a graphics application.

For example, FIGS. 1A–1C illustrate a conventional modeling program interface 100 that can be used to generate an object that includes a set of desired characteristics and/or attributes. As illustrated in window 108 of FIG. 1A, by interacting with a modeling program interface 100, a user may create a base object 110 by selecting a particular type of object (for example a sphere object) from a creation panel (not shown). Once the object is created, the objects parameters can be edited using either the creation panel (not shown) or through an object parameter menu 104. In this example, a modifier stack window 106 provides a visual representation of an underlying modifier stack 105 that depicts the base object 110 and any modifiers that have been selected for modifying the base object 110. Conventionally, the modifier stack provides a sequential hierarchical order for which the modifiers, if any, are to be applied to a base object.

Once a base object is defined, the user may apply one or more modifiers to modify the characteristics/attributes of the base object 110. For example, the user may select a bend modifier button 112 and enter bend parameter data in a bend parameter menu 114 to define a bend modifier for applying to base object 110, which may be referred to as a sphere object, to create a sphere/bend object 116 as depicted in window 108 of FIG. 1B. In particular, in response to the user defining the bend modifier, the bend modifier is inserted into the underlying modifier stack as illustrated in modifier stack 105 in modifier stack window 106 of FIG. 1B. Once inserted, the bend modifier is applied to the sphere object 110 to generate sphere/bend object 116 as depicted in window 108 of FIG. 1B.

After applying the bend modifier the user may apply additional modifiers to modify the characteristics/attributes of the sphere/bend object 116. For example, the user may select a taper modifier button 118 and enter taper parameter data in a taper parameter menu 120 to define a taper modifier for applying to the sphere/bend object 116 to create a sphere/bend/taper object 122 as depicted in window 108 of FIG. 1C. More specifically, in response to the user defining the taper modifier, the taper modifier is added to the underlying modifier stack as illustrated in modifier stack 105 in modifier stack window 106 of FIG. 1C. Once inserted, the taper modifier is applied to the sphere/bend object 116 to generate sphere/bend/taper object 122 as depicted in window 108 of FIG. 1C.

FIG. 1D illustrates a conventional underlying modifier stack 150 (as presented to the user as modifier stack 105 in modifier stack window 106 of FIG. 1C) that is used to render sphere/bend/taper object 122 in FIG. 1C. In this example, modifier stack 150 includes sphere object data 152, bend modifier data 154, taper modifier data 156 and a node world-state cache data (wscache) 158. Modifier stack 150 maintains a hierarchical order that is used in evaluating the different objects and modifiers within the stack. For example, in evaluating modifier stack 150, the lower-ordered bend modifier data 154 is applied or evaluated prior to the higher-ordered taper modifier data 156.

In this example, node wscache data 158 represents the cached result of the modifier stack evaluation. Sphere object data 152 describes the base object selected by the user while bend modifier data 154 and taper modifier data 156 describe the modifications that are to be respectively applied as the object is passed-up the modifier stack 150. For example, in evaluating modifier stack 150, a geometry type is first selected for rendering the particular object. For explanation purposes, it shall be assumed that a geometry type of mesh is selected for rendering the object. To render the object, an initial mesh object is first generated based on the properties and/or constraints that were defined in sphere object data 152 (for example, base object 110 in FIG. 1A). Next, the mesh object is passed up the modifier stack. 150 where bend modifier data 154 is then applied to a copy of the initial mesh object to create an updated mesh object (for example, sphere/bend object 116). Next, the updated mesh object is passed up the modifier stack 150 where taper modifier data 156 is then applied to a copy of the updated mesh object to further update the mesh object (for example, sphere/bend/taper object 122). Finally, the updated mesh object is passed up the modifier stack 150 to the node and gets stored in the node wscache data 158 which causes the object (sphere/bend/taper object 122) to be rendered in window 108 as illustrated in FIG. 1C.

Using a modifier stack for modeling objects is generally referred to as non-destructive modeling in that each change is reapplied or reevaluated in their specific order whenever a change is made to an object or a modifier within the modifier stack. For example, if the user redefines the dimensions of the "lower-ordered" sphere object data 152, "higher-ordered" bend modifier data 154 and taper modifier data 156 are sequentially reapplied to the newly defined mesh object prior to being displayed to the user by the node wscache data 158. Additional examples of how modifier stacks may be used to render 3-D objects is provided in U.S. Pat. No. 6,061,067, entitled APPLYING MODIFIERS TO OBJECTS BASED ON THE TYPES OF THE OBJECTS; U.S. Pat. No. 6,195,098, entitled SYSTEM AND METHOD FOR INTERACTIVE RENDERING OF THREE DIMENSIONAL OBJECTS; U.S. Pat. No. 5,995,107, entitled CACHING IN A THREE DIMENSIONAL MODELING AND ANIMATION SYSTEM; U.S. Pat. No. 6,034,695 entitled THREE DIMENSIONAL MODELING AND ANIMATION SYSTEM; U.S. Pat. No. 6,184,901 entitled THREE DIMENSIONAL MODELING AND ANIMATION SYSTEM; and U.S. patent application Ser. No. 09/286,133 entitled TRANSLATING OBJECTS BETWEEN SOFTWARE APPLICATIONS WHICH EMPLOY DIFFERENT DATA FORMATS.

However, a drawback with using a conventional modifier stack to render an object is that certain attributes and/or properties that were defined at a lower level in the modifier stack no longer influence, or may not even make sense, at a higher level in the modifier stack. For example, the sphere object data 152 may include a constraint that requires that no face on the created mesh object is to be smaller than a particular size. Thus, when creating the initial mesh object based on sphere object data 152, the constraint guarantees that the initial mesh object will be created without any faces that are smaller than the particular required size. However, the size constraint that is defined by sphere object data 152 is lost, and thus no longer active once the initial mesh object is created. Therefore, when the copy of the initial mesh object is updated based on the bend modifier data 154, the constraint information that was defined by sphere object data 152 no longer influences how the mesh object is modified. Thus, the updated mesh object that is created from applying the bend modifier data 154 may now include one or more faces that are smaller than the required size limit.

In addition, certain properties, such as the number of faces that are contained within a mesh object may dynamically change as a mesh object is passed up the modifier stack. Thus, attributes that are applied at a lower level to specific faces of the mesh object may become problematic if the faces are later removed and/or combined with other faces at a higher level in the modifier stack. For example, a base object data may require that a friction value of "10" is to be associated with face "100" while a friction value of "4" is to be associated with face "101" within the mesh object. However, if in passing the initial mesh object up the modifier stack a subsequent modifier causes faces "100" and "101" to be combined into a single face, what, or even if, a particular friction value is be associated with the single face of the updated mesh object becomes problematic, if not indeterminable at higher levels within the modifier stack.

Based on the foregoing, there is a clear need for a mechanism that allows constraints and/or properties that were assigned at a lower level of a modifier stack to influence how modifiers are to be applied at higher levels within the modifier stack.

SUMMARY OF THE INVENTION

A method and apparatus are provided for implementing stack extensions in a modifier stack that is associated with a plurality of components that are sequentially applied to a geometry object when the modifier stack is evaluated. According to one aspect of the invention, an extension channel object is attached to the geometry object. The extension channel object is associated with a notification mechanism that notifies the extension channel object if a particular event occurs while the modifier stack is being evaluated. In response to receiving a notification that one of the plurality of components has caused a particular event to occur while the modifier stack is being evaluated, the extension channel object influences how the geometry object is modified by the component within the modifier stack.

The invention also encompasses a computer-readable medium, a computer data signal embodied in a carrier wave, and an apparatus configured to carry out the foregoing steps. Other features and aspects will become apparent from the following description and the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A illustrates an example of a user interface window in which certain embodiments of the invention may be utilized;

FIG. 3C illustrates an example of a user interface window in which certain embodiments of the invention may be utilized;

DETAILED DESCRIPTION OF THE INVENTION

Figure 1A:
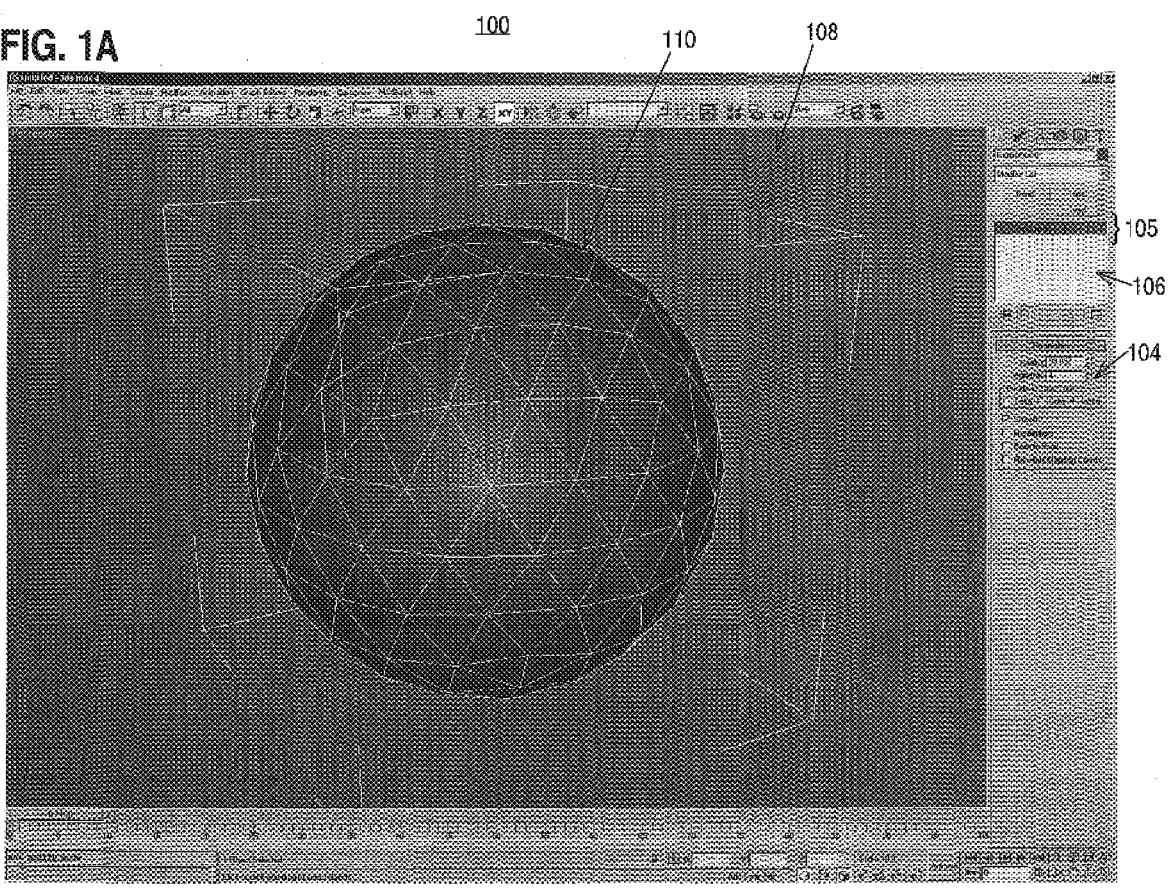
FIG. 1A depicts a conventional modeling program interface.
Figure 1B:
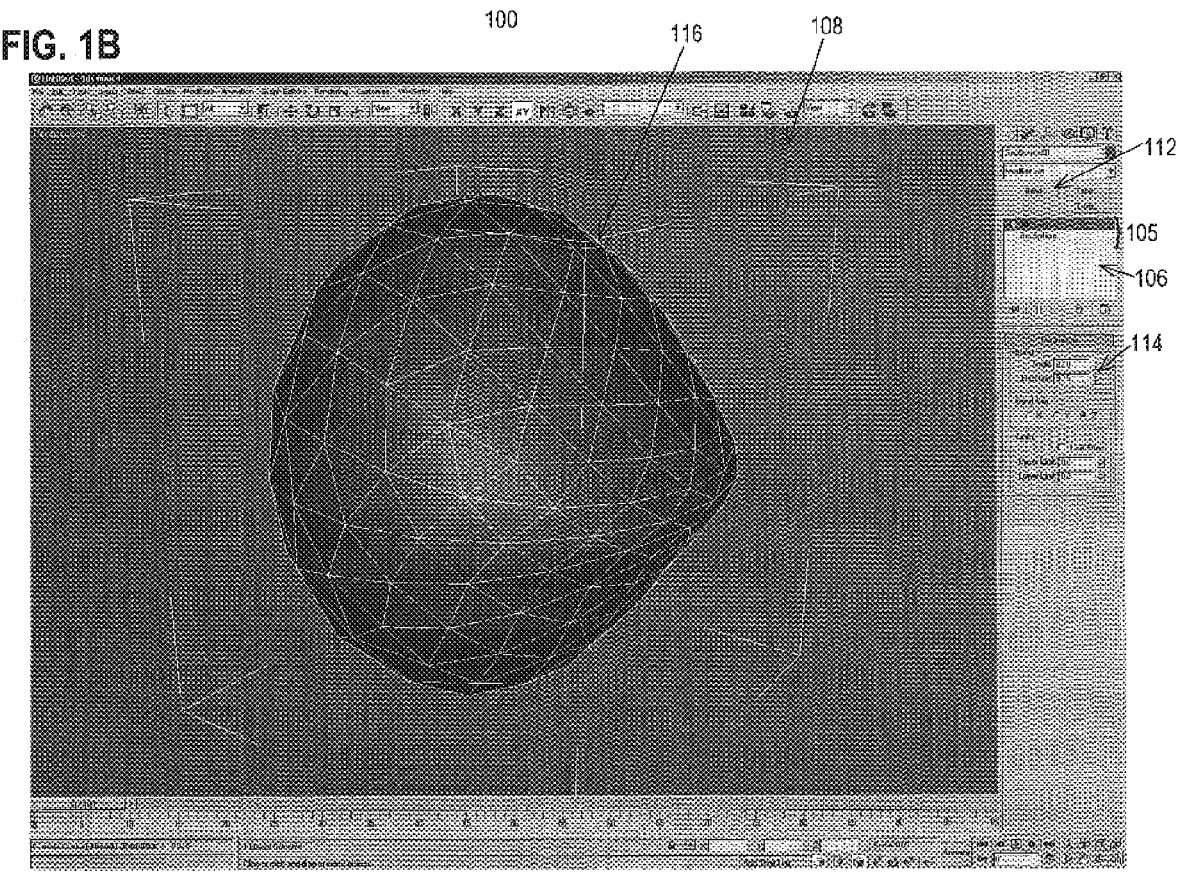
FIG. 1B depicts another view of the conventional modeling program interface shown in FIG. 1A.
Figure 1C:
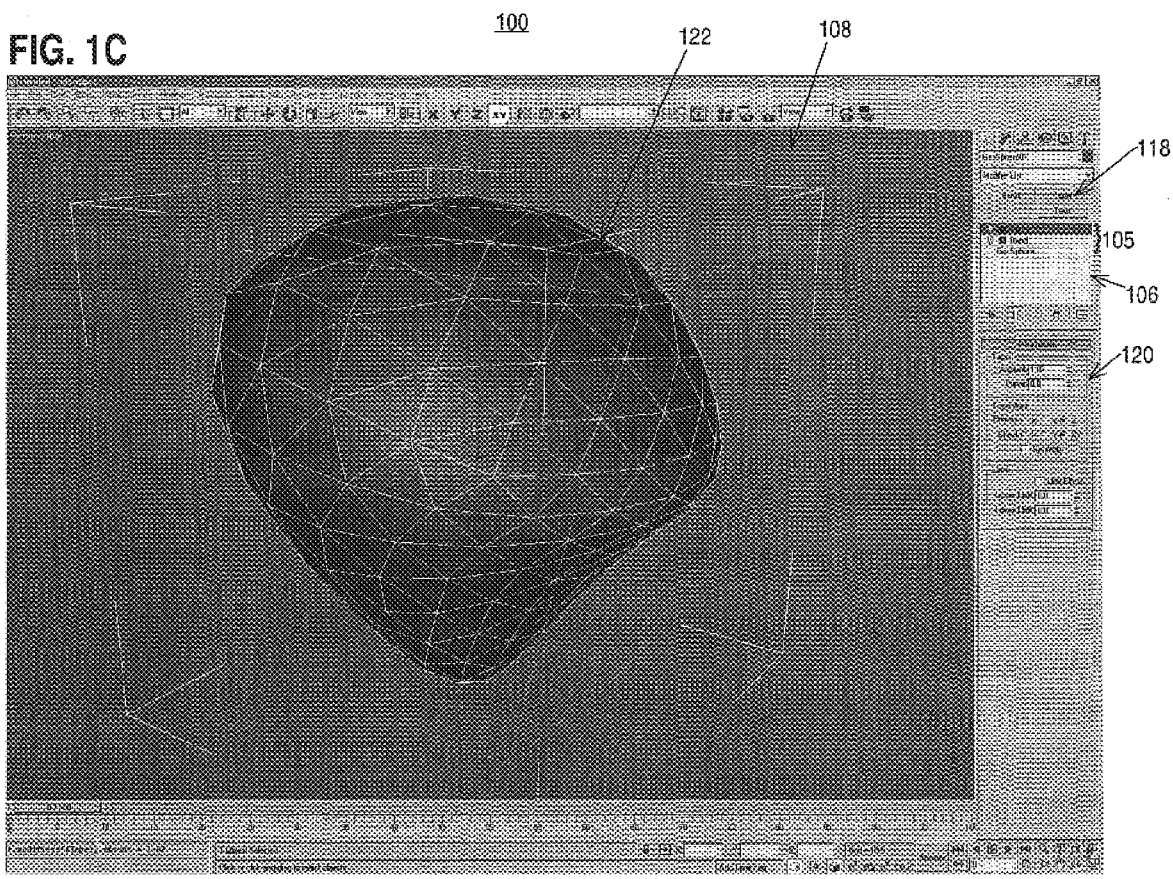
FIG. 1C depicts still another view of the conventional modeling program interface shown in FIG. 1A.
Figure 1D:
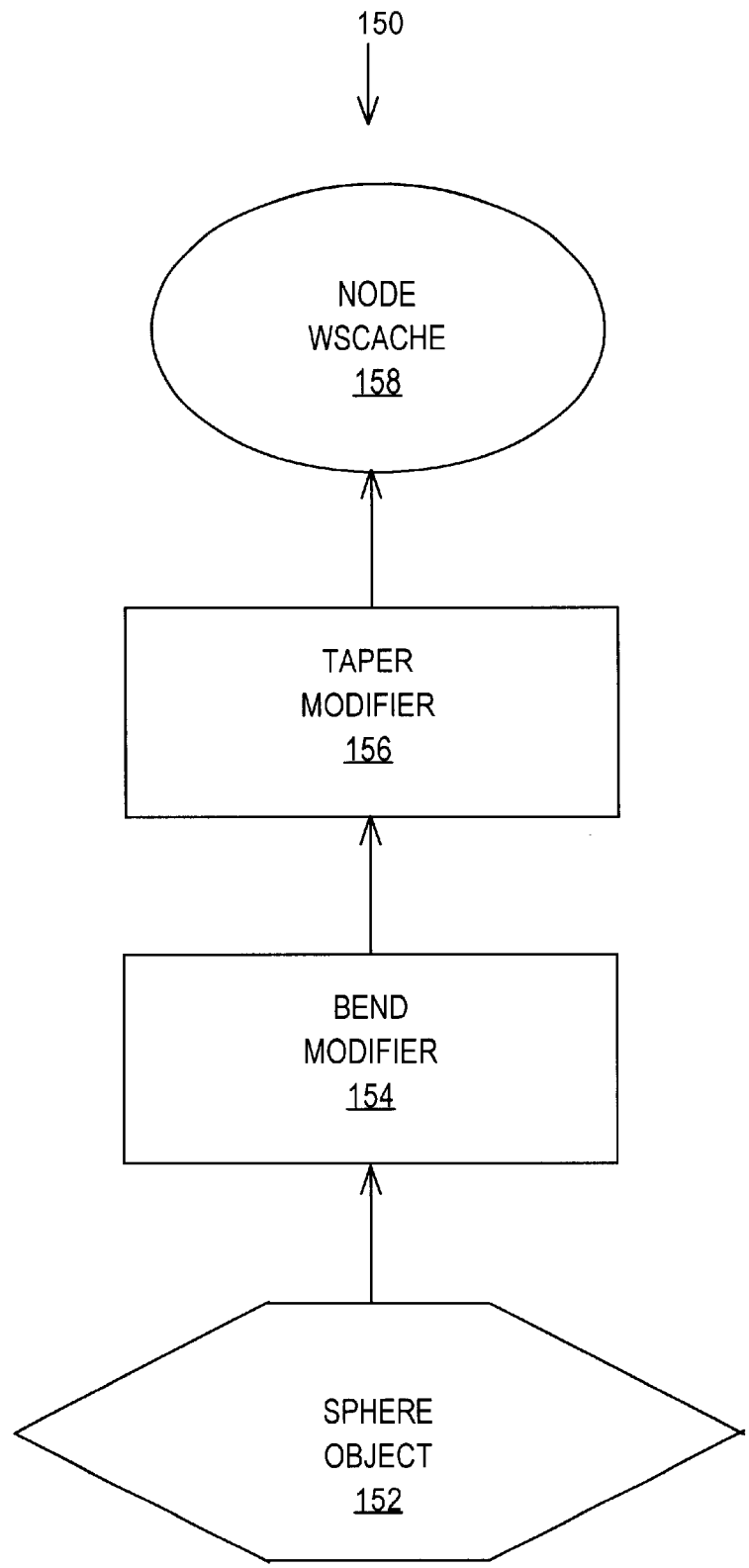
FIG. 1D depicts a typical modifier stack that is used by a conventional modeling program.

A stack extension mechanism is provided for implementing extension channels within a modifier stack. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

A stack extension mechanism is provided for supporting extension channels within a modifier stack. In certain embodiments, a user interface is provided that allows an individual to associate an extension channel (XTC) Object with a geometry object that is passed up a modifier stack. In one embodiment, the XTC Objects extend the flexibility of a modifier stack by providing a notification mechanism that allows lower-ordered components of a modifier stack to influence the changes that are made by higher-ordered components within a modifier stack.

For example, by associating an XTC object with a geometry object that is being passed up a modifier stack, a notification mechanism is provided whereby the XTC Object is notified in response to a particular event occurring during the evaluation of the modifier stack (for example, prior to, and/or subsequent to, a change being made to the geometry object). In response to the notifications, the XTC Object can take one or more actions to propagate up the modifier stack constraints and/or properties that are associated with the XTC Object. Thus, in one aspect, the XTC Objects provide a mechanism that allows a lower-ordered base object or a lower-ordered modifier to influence how a higher-ordered modifier is applied within a modifier stack.

In certain embodiments, a user interface provides a set of predefined class object methods that define specific actions that trigger the notification of an XTC object. The set of predefined class object methods provide a fine-grain notification mechanism that can be used for controlling the particular events that trigger the notification of an XTC Object as the XTC Object is passed up the modifier stack with the associated geometry object.

For example, an Xmodifier can be inserted into a modifier stack to cause an XTC Object to attach to the geometry object that is based on a lower-ordered sphere object. Thereafter, in response to a higher-ordered bend modifier being applied to the geometry object, the notification mechanism causes the XTC Object that is attached to the geometry object to be notified. In response to the notification, the XTC Object can take certain actions to influence how the higher-ordered bend modifier is to be applied to the geometry object. By associating an XTC modifier with a lower-ordered geometry object, properties and/or constraints that have been defined by a lower-ordered component can be propagated up the stack to influence how and/or what changes can be made to the geometry object by higher-ordered components.

In certain embodiments, multiple XTC Objects may be attached to a geometry object as the geometry object is passed up a modifier stack. Each XTC Object may be associated with different constraints and/or properties, and may be configured to respond to a variety of different events that may occur during the evaluation of the modifier stack. In certain embodiments, when multiple XTC Objects are attached to a geometry object, a priority ordering may be established that defines a specific order in which the multiple XTC Objects are evaluated. For example, by associating a priority field with the XTC Objects, a user may define a specific order in which multiple XTC Objects within a modifier stack are to be evaluated.

Associating Extension Channel Objects With Geometry Objects

Figure 2B:
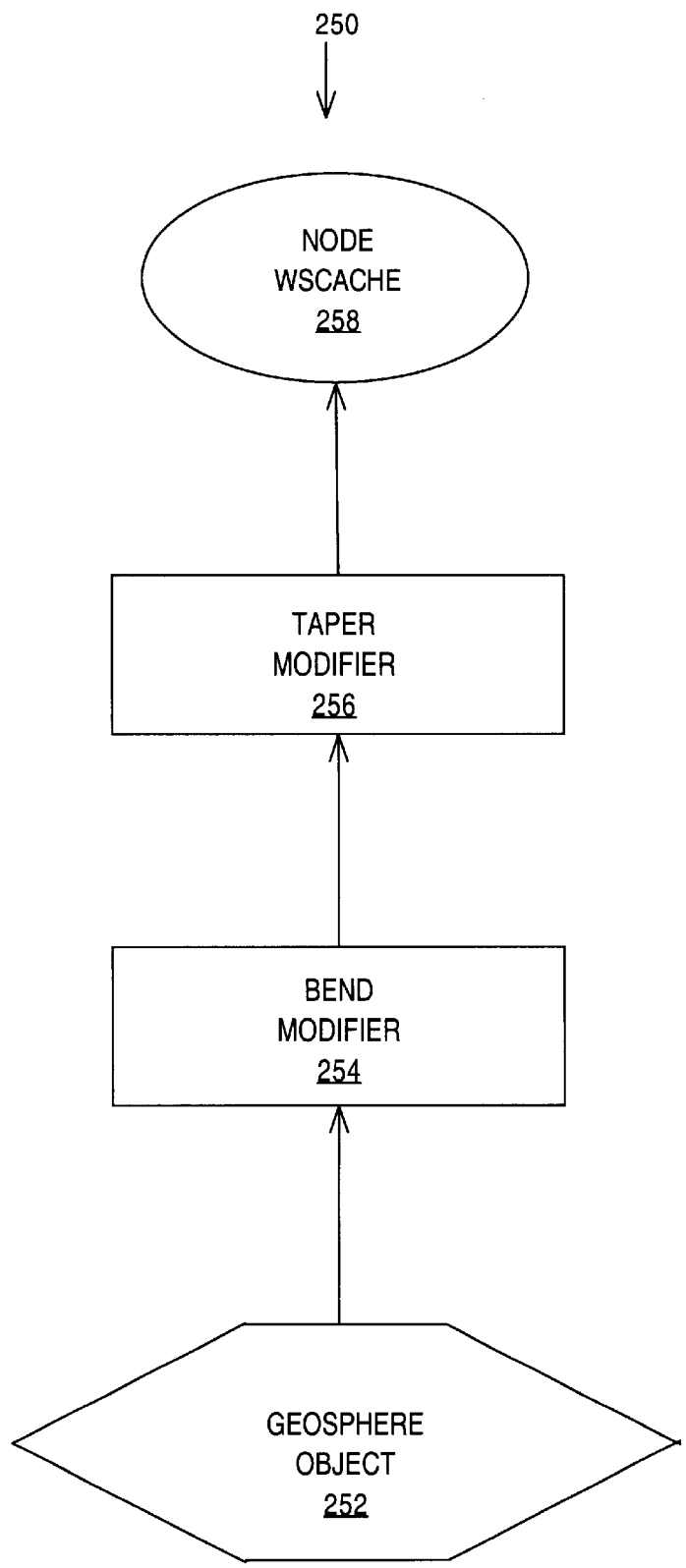
FIG. 2B illustrates an example of an underlying modifier stack based on the user selections of FIG. 2A.

FIG. 2A illustrates an example of a user interface window 200 in which certain embodiments of the invention may be used. For explanation purposes, FIG. 2A is discussed in conjunction with the components of FIG. 2B. As illustrated in the example of FIG. 2A, a user interface window 200 is provided that includes, among other things, a display window 202, a base object name identifier 206, a modifier selection menu 208, a stack window 210, a base object parameter menu 212, a set of modifier buttons (216, 218, 220), and an extension channel modifier button 222.

Base object name identifier 206 identifies the name that is currently associated with the rendered object. Base object parameter menu 212 provides a list of parameters that are associated with the selected base object type and that can be used to define specific characteristics of the selected base object. Modifier selection menu 208 provides a drop-down menu that allows a user to choose a modifier that is to be inserted into the modifier stack. In certain embodiments, the drop-down menu provides a list that shows all applicable modifiers that can be inserted into the modifier stack based on the base object that is currently selected. Modifier buttons (216, 218, 220), on the other hand, are associated with a set of "commonly used" modifiers that allow a user to easily select and insert a commonly used modifier into a modifier stack. Once inserted, the modifiers are applied in sequential order to the geometry object when evaluating the modifier stack.

Stack window 210 provides a visual representation of the underlying modifier stack that has been currently defined by the user. In this example, the user has defined a modifier stack 214 as shown in stack window 210. Currently, modifier stack 214 includes a base object (GeoSphere 224), and two modifiers (Bend modifier 226 and Taper Modifier 228). FIG. 2B illustrates an example of an underlying modifier stack 250 that has been generated based on the user's current selections as illustrated in modifier stack 214.

Parameter menu 212 allows the user to define specific parameter values for the component or item that is currently selected in modifier stack 214. In this example, because the user has selected the base object (GeoSphere 224), parameter window 212 provides a set of parameter options that are associated with a GeoSphere base object. Alternatively, if the user had selected a different component in modifier stack 214, or if the base object was of a different object type, for example a rectangular box, parameter window 212 would display a different set of parameter options that correspond to that particular object type.

XModifier button 222 allows a user to insert an Xmodifier into the modifier stack 214. The use of Xmodifiers is described in further detail below.

Display window 202 provides a window interface for displaying one or more rendered objects. In this example, display window 202 includes a sphere/bend/taper object 204. The sphere/bend/taper object 204 was formed by (1) creating a base geometry object ("sphere geometry object") based on a defined set of GeoSphere parameter values (geosphere object data 252 of FIG. 2B); (2) applying a bend modifier (bend modifier data 254 of FIG. 2B) to a copy of the sphere geometry object to create an updated geometry object ("sphere/bend geometry object"); and (3) applying a taper modifier (taper modifier data 256 of FIG. 2B) to a copy of the sphere/bend geometry object to create a sphere/bend/taper geometry object as depicted by sphere/bend/taper object 204 in display window 202 of FIG. 2A.

As illustrated by sphere/bend/taper object 204, a geometry type of "mesh" has been used in evaluating the modifier stack. However, embodiments of the invention are not limited to any particular geometry type. For example, embodiments of the invention may also include a variety of other geometry types, including but not limited to, NURBs, patches, and spline geometry types.

In the example depicted in FIG. 2A, the application of bend modifier 226 and the taper modifier 228 have caused certain faces within the sphere/bend/taper object 204 to be shaped as long thin triangles ("problematic faces"). However, a drawback with having these problematic faces is that they can produce artifacts when rendered.

Figure 3A:
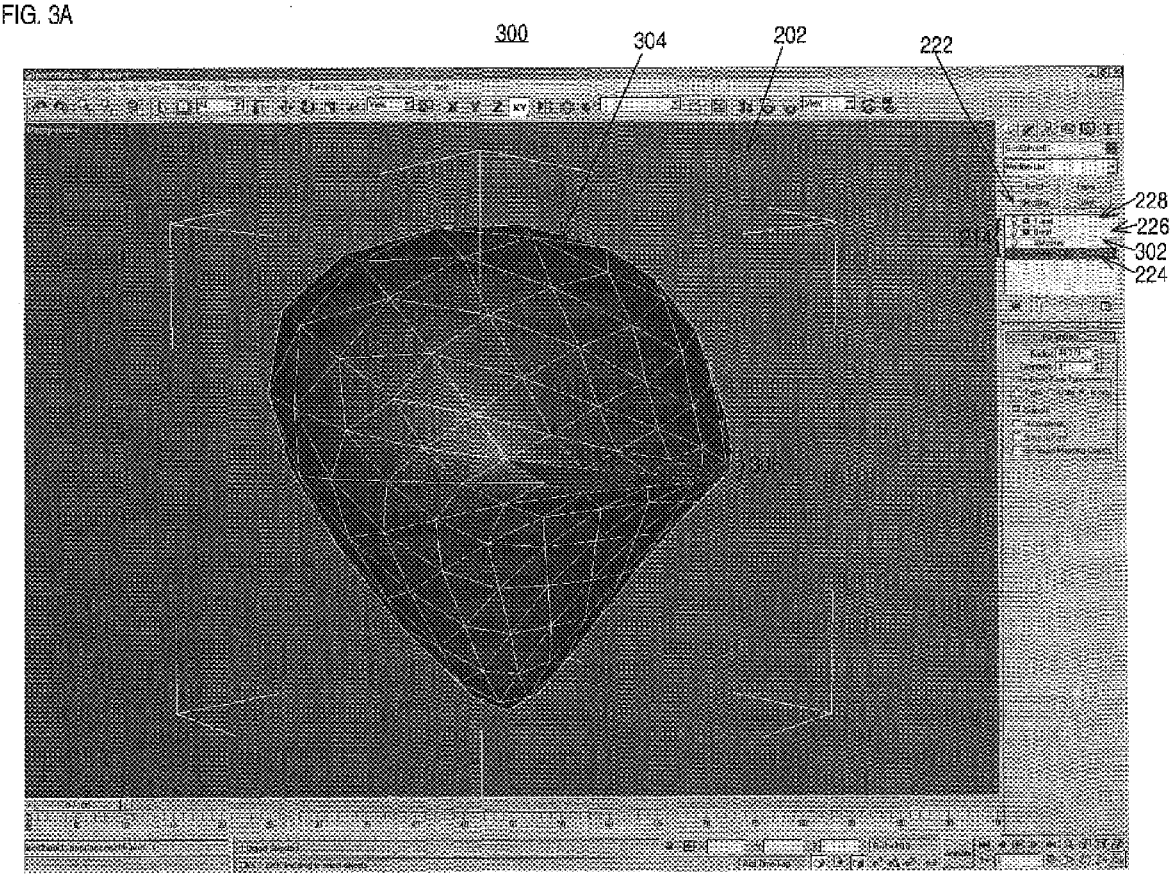
FIG. 3A illustrates a further example of a user interface window in which certain embodiments of the invention may be utilized.
Figure 3B:
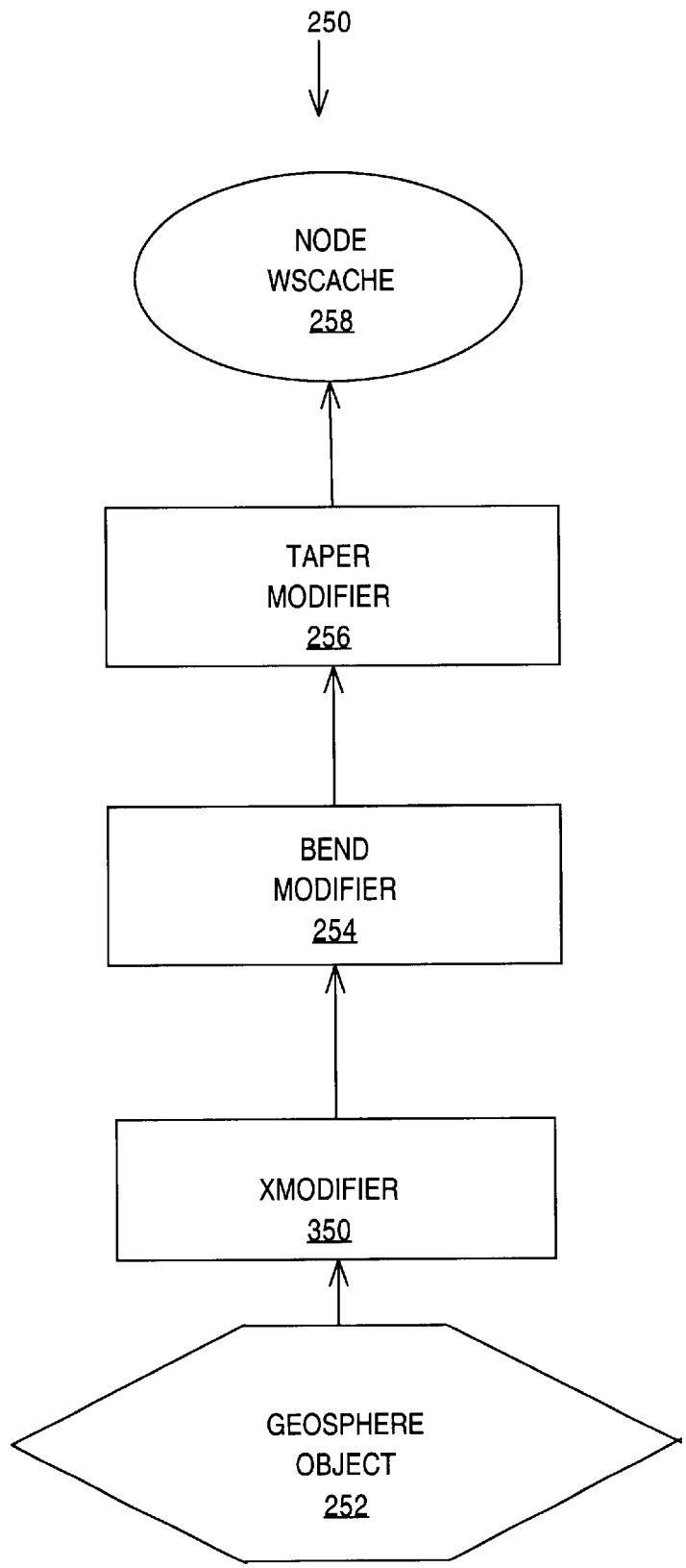
FIG. 3B illustrates an example of an underlying modifier stack based on the user selections of FIG. 3A.

FIG. 3A illustrates an example of a user interface window 300 in which an Xmodifier has been inserted into the modifier stack to cause an XTC Object to be associated with the geometry object of a base object ("base geometry object") as the base geometry object flows up the modifier stack. For explanation purposes, FIG. 3A is discussed in conjunction with FIG. 3B. As illustrated in the example of FIG. 3A, a user has interacted with user interface window 300 to insert an XModifier 302 into modifier stack 214. Thereafter, when XModifier 302 is evaluated within the modifier stack, XModifier 302 causes an XTC Object to be associated with the base geometry object that was generated based on GeoSphere 224. For example, in response to the user selecting GeoSphere 224, and then selecting extension channel modifier button 222, XModifier data 350 (FIG. 3B) is inserted into modifier stack 250 (FIG. 3B). Thereafter, when Xmodifier data 350 is evaluated in modifier stack 250, Xmodifier data 350 causes an XTC object to be associated with the base geometry object that is generated by geosphere object data 252.

In certain embodiments, the XTC Object functions as a "plug-in" that is attached to a geometry object as the geometry object flows up the modifier stack. In one embodiment, XTC Objects employ a notification mechanism, for example a callback mechanism, that is used to notify an XTC Object in response to a particular event occurring while evaluating the underlying modifiers of modifier stack 214. For example, the notification mechanism may be configured to notify a particular XTC Object prior to, and/or after any changes are to be made to the geometry object as the geometry object flows up the modifier stack. In certain embodiments, the notification mechanism includes identification information that identifies, for example, the name, class, and/or instance of the modifier that is being applied to the geometry object. In response to the notifications, the XTC Object can take appropriate actions to ensure that certain defined properties and/or constraints are allowed to flow up the modifier stack and/or to influence the changes that are made by higher-ordered components within the modifier stack. For example, as discussed in further detail below, the appropriate actions may include the modification of the geometry object and/or the "disabling" of a higher-ordered component within the modifier stack.

For example, as previously explained in FIG. 2A, because a size constraint is not active once the base geometry object is created and passed up the modifier stack, the application of bend modifier 226 and/or taper modifier 228 has caused sphere/bend/taper object 204 of FIG. 2A to include several problematic faces. However, as illustrated in FIGS. 3A and 3B, in response to a user interacting with interface window 300 to define, for Xmodifier 302, a minimum size constraint for faces within the geometry object and to insert Xmodifier 302 into modifier stack 214, XModifier data 350 is inserted into modifier stack 250 which causes an XTC Object, having the minimum size constraint, to be attached to the geometry object. Thereafter, by notifying the XTC Object when certain events occur during the evaluation of modifier stack 250, the XTC Object may perform specific tasks or actions to allow the constraint to remain "active" as the geometry object is passed up the modifier stack. In particular, by notifying the XTC Object prior to, and/or subsequent to a change being made to the geometry object as the geometry object is passed up the modifier stack, the XTC Object can take appropriate actions to ensure that certain properties and/or constraints are allowed to propagate up the modifier stack. For example, as illustrated in FIG. 3A, the size constraint has been allowed to propagate up the modifier stack and to influence higher-ordered components (bend modifier 226, taper modifier 228) to cause a set of problematic faces 306 to be displayed using a different color, shading, or cross hatching as depicted in sphere/bend/taper object 304. Thus allowing a user to quickly identify any problematic faces that are contained within sphere/bend/taper object 304.

FIG. 3B illustrates an example of an updated underlying modifier stack 250 that has been generated based on the user's current selections as illustrated in modifier stack 214 of FIG. 3A. In this example, an XModifier (XModifier data 350) has been inserted into modifier stack 250 and used to associate an XTC Object with the geometry object that is created based on geosphere object data 252. As further depicted, XModifier data 350 has been inserted into modifier stack 250 below both bend modifier data 254 and taper modifier data 256. Thus, in evaluating modifier stack 250, XModifier data 350 is evaluated prior to bend modifier data 254 and taper modifier data 256. Thus, the XTC Object is attached to the geometry object prior to when bend modifier data 254 and taper modifier data 256 are applied to the geometry object. By requiring that XTC Object be notified prior to, and/or subsequent to the application of bend modifier data 254 and/or taper modifier data 256, the XTC Object can take appropriate actions to ensure that certain properties and/or constraints that are associated with the XTC Object are allowed to influence what, if any, changes are made to the geometry object by bend modifier data 254 and/or taper modifier data 256.

Figure 3D:
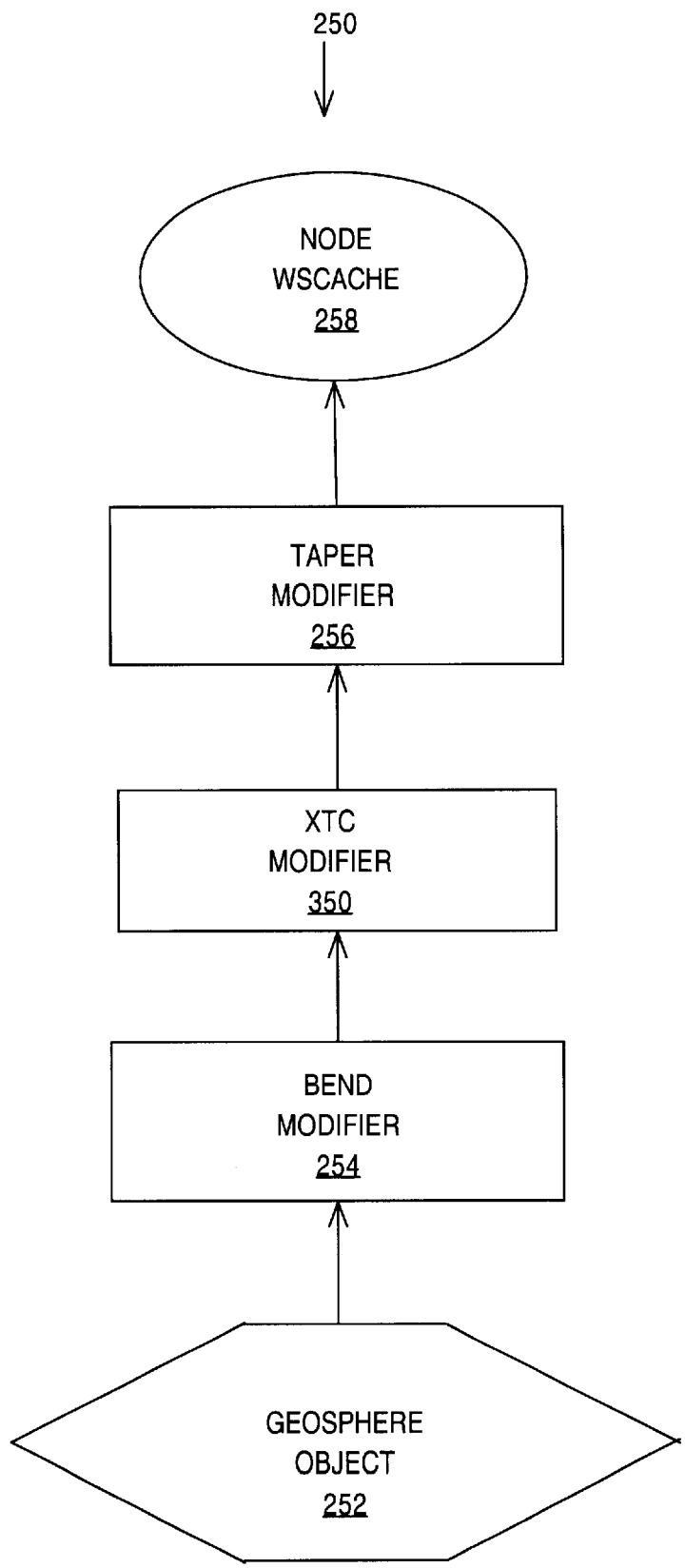
FIG. 3D illustrates an example of an underlying modifier stack based on the user selections of FIG. 3C.

In certain embodiments, an Xmodifier may be relocated within a modifier stack by selecting the Xmodifier and then dragging and releasing the Xmodifier at a different position within the modifier stack. For example, by selecting Xmodifier 302 in FIG. 3A, and then dragging and dropping the Xmodifier between bend modifier 226 and taper modifier 228 in modifier stack 214, the Xmodifier may be relocated within modifier stack 214, as illustrated by Xmodifier 302 in FIG. 3C and Xmodifier data 350 in FIG. 3D.

Associating Extension Channel Objects with Base Objects

Figure 4A:
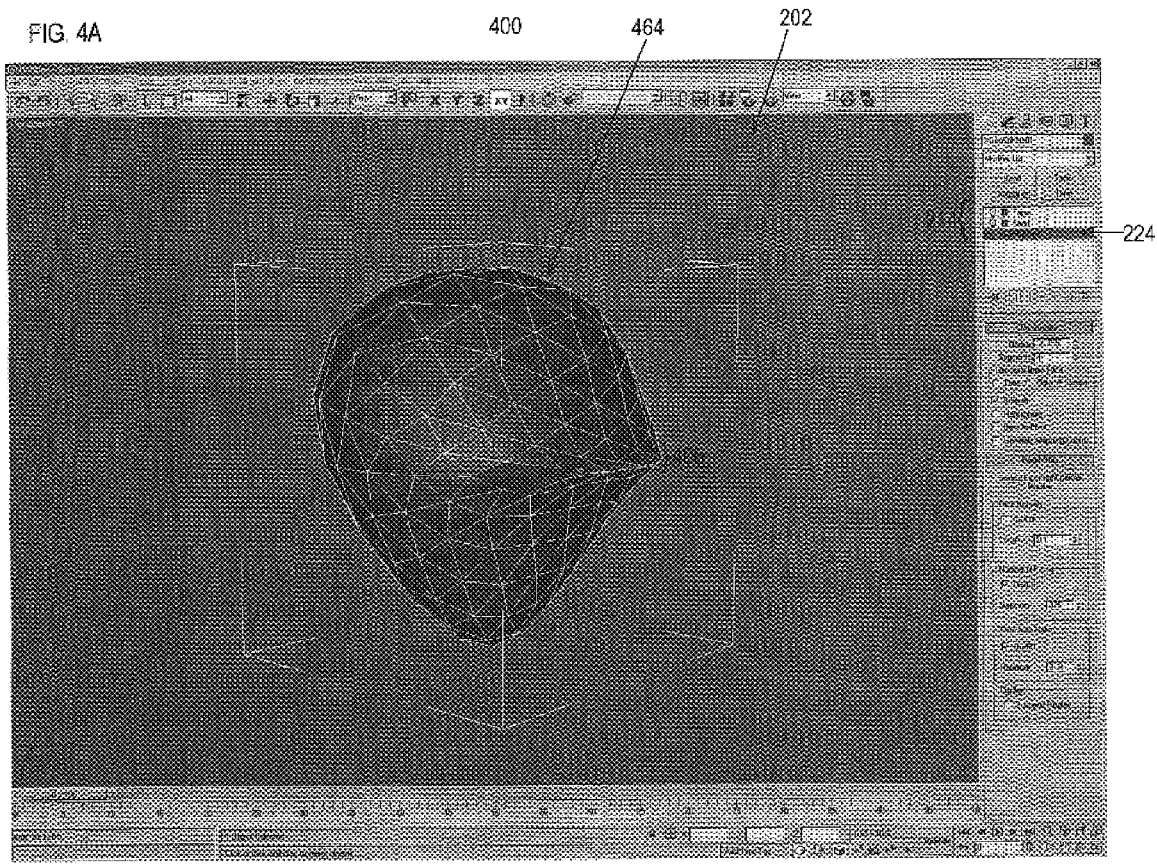
FIG. 4A illustrates a further example of a user interface window in which certain embodiments of the invention may be utilized.

In addition to using XModifiers to attach XTC Objects to geometry objects, in certain embodiments of the invention, a base object may be defined that when evaluated within the modifier stack, causes an XTC Object to be attached to the base geometry object. For example, FIG. 4A illustrates an example of a user interface window 400 in which a base object, XGeoSphere 424 has been defined and inserted into stack 214. In this example, in defining XGeoSphere 424, the user has interacted with interface window 400 to associate the previously defined face size constraint with XGeoSphere 424.

Figure 4B:
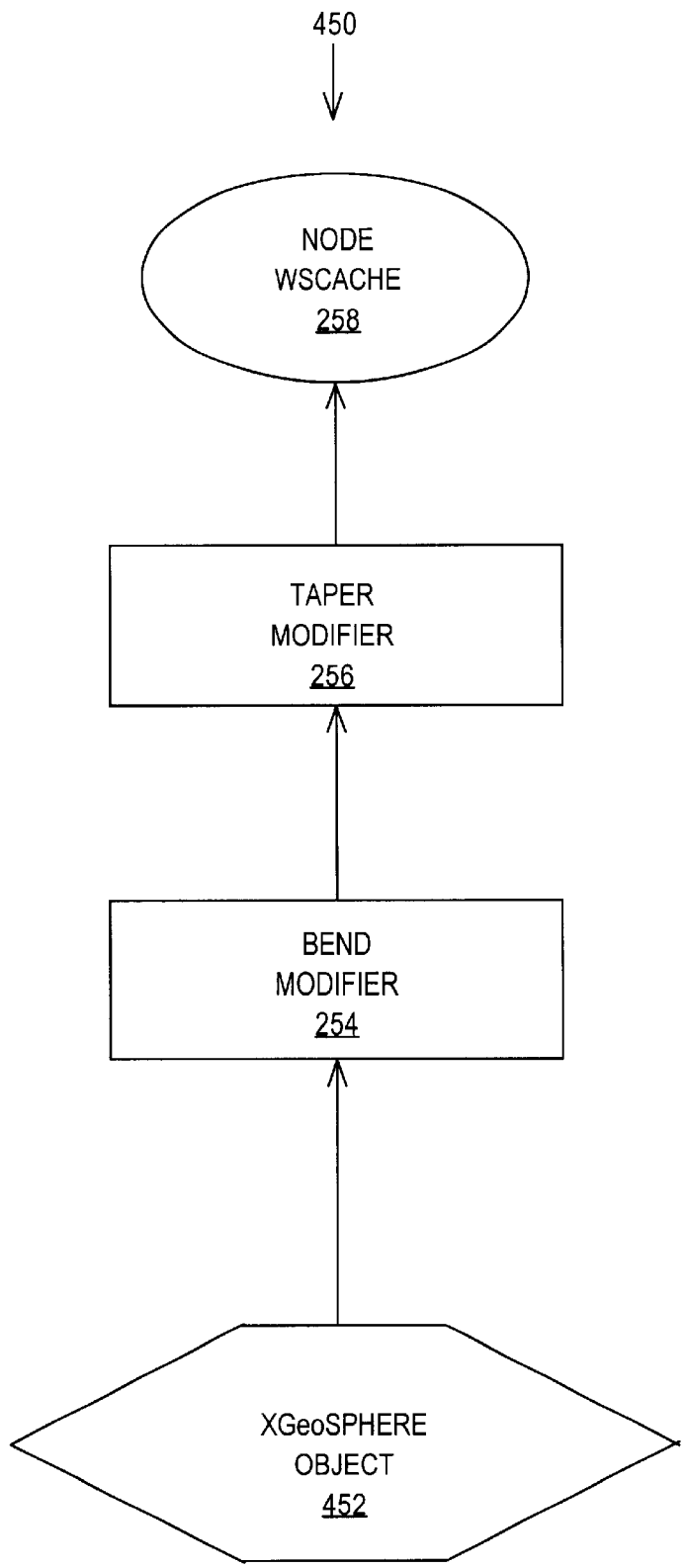
FIG. 4B illustrates an example of an underlying modifier stack based on the user selections of FIG. 4A.

FIG. 4B illustrates an example of the underlying modifier stack 450 that has been generated based on the user's current selections as illustrated in modifier stack 214 of FIG. 4A. In response to the user inserting XGeoSphere 424 into stack 214, XGeoSphere data 452 is inserted into the underlying modifier stack 450. As further evident, the user has also defined a bend modifier (modifier data 254) and a taper modifier (taper modifier data 256) as higher-ordered components to modify the base geometry object as the base geometry object flows up the modifier stack 450.

In response to evaluating modifier stack 450, XGeoSphere data 452 causes an XTC Object to be attached to the geometry object that is created based on XGeoSphere data 452 ("base geometry object"). For explanation purposes, it is assumed that the XTC Object has been configured so as to be notified prior to and subsequent to any changes being made to the geometry object as the geometry object flows up the modifier stack 450. Thus, as described in further detail below, as the geometry object flows up the modifier stack 450, the XTC Object is notified prior to, and subsequent to the application of bend modifier data 254 and taper modifier data 256 to the geometry object. In response to the notifications, XTC Object may take specific actions to ensure that geometry object conforms with the previously defined face size constraint.

Enforcing Properties and/or Constraints within a Modifier Stack

In response to being notified that a particular event has occurred within a modifier stack, a variety of different actions may be taken to ensure that a particular property and/or constraint is allowed to flow up the modifier stack. For example, referring back to FIG. 3B, it is assumed that the XTC Object that is generated and attached by Xmodifier data 350 to the base geometry object, includes the previously described face size constraint. Then, in response to being notified that bend modifier data 254 is about to be applied to the base geometry object, the XTC Object may cause a copy of the base geometry object ("prior geometry version") to be stored in memory. Then, when the XTC Object is again notified after the change has been made by applying bend modifier data 254 to generate an updated geometry object ("updated geometry version"), the XTC Object may compare the states of the prior geometry version with the state of the updated geometry version. Based on the comparison, the XTC Object can modify the original base geometry object as necessary to create a "new" original geometry version that will cause the application of the bend modifier data 254 to generate a geometry object that conforms to the face size constraint. Thus, once the modifications are made by the XTC Object and the new original version is again passed up the modifier stack, the application of bend modifier data 204 will create a geometry object that conforms with the face size constraint.

In certain embodiments, XTC Objects may recursively and/or repeatedly apply changes to a geometry object based on the changes that were made by a higher-ordered modifier. For example, if after determining that the updated geometry object that is created by applying the bend modifier data 204 to the new original version are still inappropriate, the XTC Object may further modify the base object data as deemed appropriate.

In another embodiment, an XTC Object may propagate a particular property and/or constraint up the modifier stack by "disabling" a higher-ordered modifier. For example, referring to FIG. 3B, in response to the XTC Object being notified that bend modifier data 254 has been applied to create an updated geometry object, the XTC Object may substitute the base geometry object for the updated geometry object within the modifier stack 250. Thereafter, the base geometry object can flow up the modifier stack 250 where taper modifier data 256 is then applied. By, substituting a later generated (higher-ordered) geometry object with a previously generated (lower-ordered) geometry object, an XTC Object has the ability to "disable" higher-ordered modifiers.

Multiple Geometry Object Types

Although certain examples have been illustrated in reference to the use of geometry objects of type mesh (mesh objects), embodiments of the invention are not limited to any particular geometry type. For example, instead of using a mesh object as depicted in the example of FIG. 3A, other geometry types such as splines, patches, NURBs, etc. may be used in evaluating an object within a modifier stack.

In addition, in certain embodiments of the invention, two or more different geometry types may be used in evaluating an object within a single modifier stack. For example, different geometry types are associated with different characteristics. In certain situations, the characteristics of one geometry type (e.g., Patches) may be more desirable than the characteristics of another (e.g., NURBs). Thus, it may be desirable to use different types of geometry objects when evaluating a modifier stack. For example, referring to FIG. 3B, a geometry object of type mesh may be used to generate the geometry object based on geosphere object data 252 while a geometry object of type NURB may be used to generate the geometry object based on bend modifier data 254.

In certain embodiments, XTC Objects can conform to multiple geometry types. In one embodiment, as the geometry object is converted from one geometry type to another, the XTC object that is associated with the geometry object automatically conforms to work with each new geometry type as the geometry object is propagated up the modifier stack. For example, in certain embodiments, the XTC Object is copied over to the newly generated geometry type and associated with the notification mechanisms that were previously defined for the prior geometry type. In certain embodiments, a callback message that notifies the XTC Object of the geometry type change includes information that identifies the current geometry type and the new geometry type. Based on this information, the XTC Object performs the necessary steps to convert to the new geometry type.

Notification of Change

As previously indicated, XTC Objects are notified when certain events occur during the evaluation a modifier stack. In one embodiment, a callback mechanism is used to notify an XTC Object prior to a change being made to the geometry object. In response to the "prior" notification, the XTC Object can perform certain actions prior to the change being made. Additionally, the callback mechanism may be used to notify an XTC Object after a change has been made to the geometry object. In response to the "subsequent" notification, the XTC modifier may also perform certain actions subsequent to the change being made.

Figure 5:
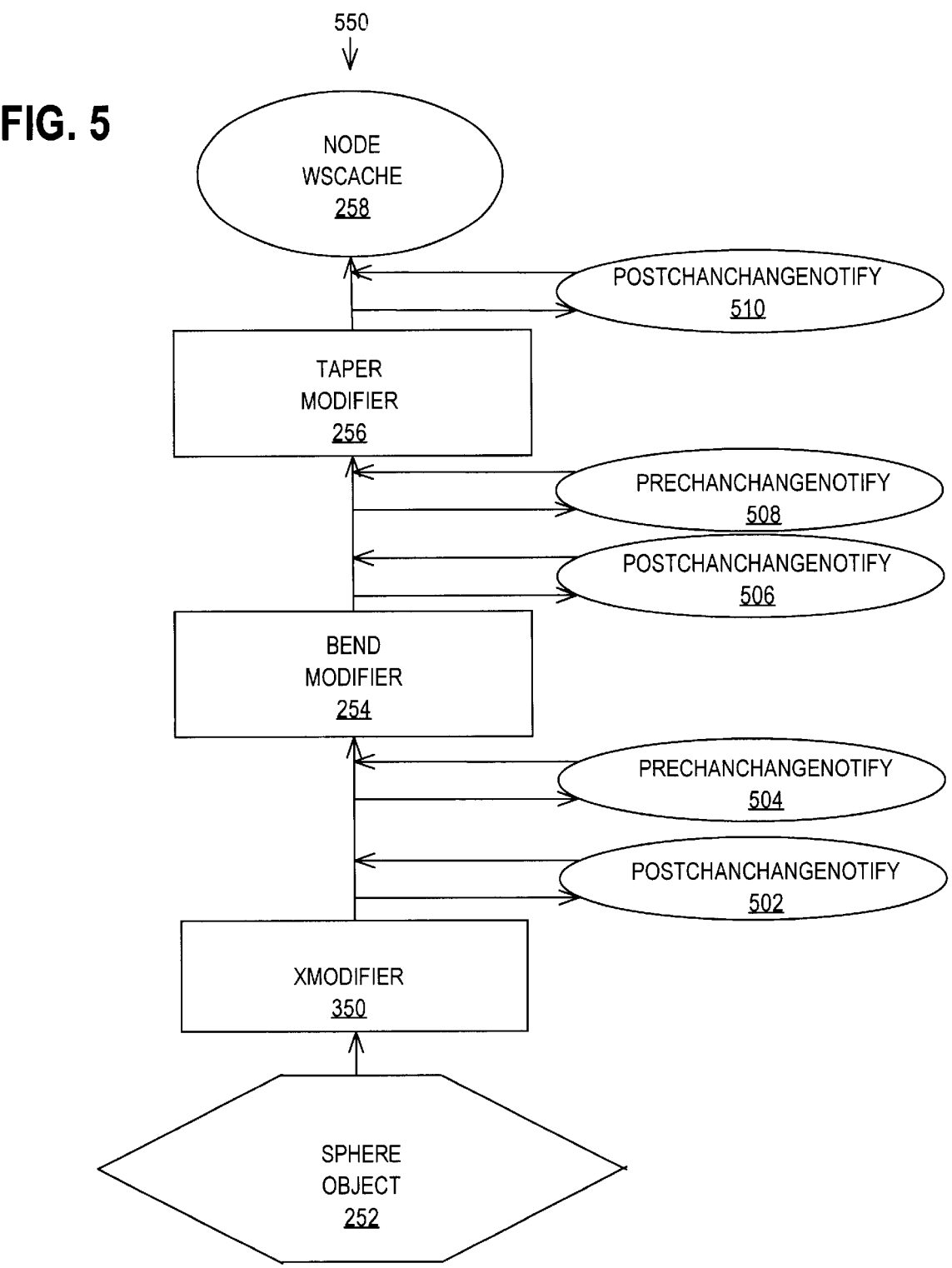
FIG. 5 illustrates a set of notification objects that are used to notify an XTC object in response to certain events occurring during the evaluation of a modifier stack.

For example, FIG. 5 illustrates a set of notification objects (prechangenotify objects 504, 508, and postchangenotify objects 502, 506, 510) that are respectively used to notify the attached XTC Object prior to, and subsequent to, any changes that are made to the geometry object as the geometry object is propagated up modifier stack 550. In this example, in response to the geometry object being modified by (1) XTC modifier data 350 (i.e., associating the XTC Object with the base geometry object), (2) bend modifier data 254 and (3) taper modifier data 256, postchangenotify objects 502, 506 and 510 respectively notify the XTC Object that a change has been made to the geometry object. In response to each of the "post-notifications", the XTC Object may initiate one or more actions that can affect how the previous changes are applied to the geometry object in evaluating modifier stack 550. Similarly, prior to the geometry object being modified by bend modifier data 254 and taper modifier data 256, prechangenotify objects 504 and 508 respectively notify the XTC Object that a change is about to be made to the geometry object. In response to each of the "pre-notifications", the XTC Object may initiate one or more actions that can affect how the changes are actually applied to the geometry object in evaluating modifier stack 550.

For example, in response to being notified by prechangenotify object 504 that bend modifier data 254 is about to be applied to the geometry object, the XTC Object may store the pre-configuration of the geometry object. Then, subsequent to the application of bend modifier data 254 to the geometry object, and in response to being notified by postchangenotify object 506 that bend modifier data 254 has been applied to the geometry object, the XTC Object may compare the pre-configuration of the geometry object with the post-configuration of the geometry object to determine what changes were made to the geometry object by applying bend modifier data 254. Based on these changes, the XTC Object can modify or update the base geometry object (geosphere data 252) to cause the sphere/bend geometry object to conform to the properties and/or constraints that were previously defined for the XTC Object.

For example, a base object data may require that a friction value of "10" is to be associated with face "100" while a friction value of "4" is to be associated with face "101" within the mesh object. In addition, an Xmodifier may be inserted in the modifier stack that defines a constraint such that if two faces having different friction values are ever combined into a single face, the average of the two fiction values (in this case "7") is to be applied to the combined face. Thus, if in passing the mesh object up the modifier stack a modifier causes faces "100" and "101" to be combined into a single face, the XTC Object that is attached to the mesh object by Xmodifier can enforce the constraint by causing the combined face (combination of faces 100 and 101) to be assigned a friction value of "7".

For explanation purposes, examples have been provided illustrating a notification mechanism that employs prechangenotify and postchangenotify object methods to notify the XTC Object. However, embodiments of the invention are limited to any particular type of object method and/or notification mechanism.

Controlling the Displayed Object

XTC Objects can also be used to control how and/or where certain data is displayed within a view port. For example, referring to FIGS. 3A and 3B, at the end of evaluating modifier stack 250, node wscache 258 generates the geometry object in world space and displays the geometry object in display window 202. For example, node wscache 258 may be associated with a method Display that is used to display the geometry object at the end of the stack. In certain cases, in reaching the end of the modifier stack 250, the XTC Object is still attached to the geometry object when the Display method is called to display the geometry object. In one embodiment, the XTC Object is notified prior to the Display method being called. In response, the XTC Object can take certain actions to control what information is displayed in display window 202. For example, in response to being notified that the Display method is about to be called, the XTC Object can disable the drawing of the geometry object so that only the result of the XTC object is visible. For example, the XTC object could disable the drawing of the geometry objects that only the faces that don't meet a specific size requirement are displayed within display window 202. The following is an example of a sequence that may be used to control the information that is drawn within display window 202.

If not (XTCObj->SuspendDisplay( ))
{
object->Display( );
}
XTCObj->Display( );

In certain embodiments, once an object has been displayed within a display window, an XTC object can cause additional items and/or information to be drawn for display within display window 202. As for example, after sphere/bend/taper object 304 is displayed in display window 202, the XTC object associated with Xmodifier 350 (FIG. 3B) can cause additional objects to be displayed and/or certain information to be displayed with the faces of sphere/bend/taper object 304.

Collapsing a Modifier Stack

Figure 6A:
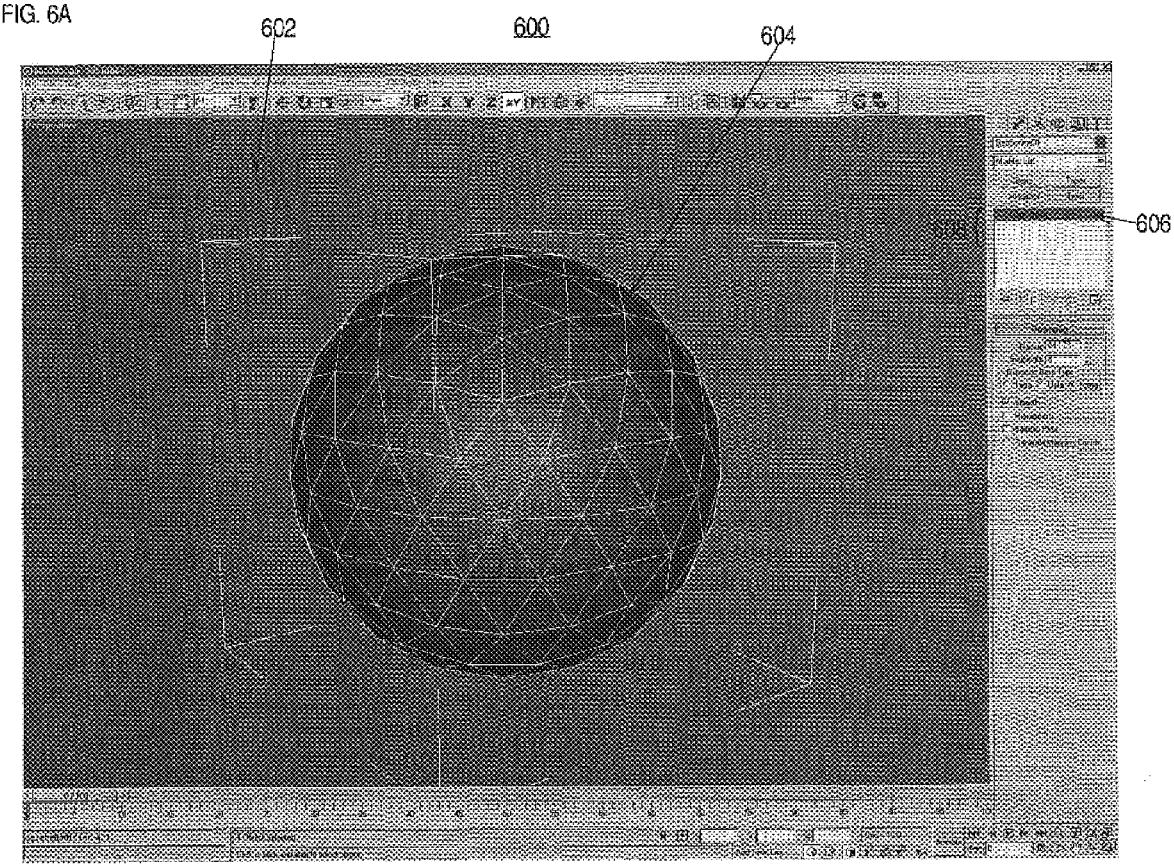
FIG. 6A illustrates a technique for collapsing a modifier stack.
Figure 6B:
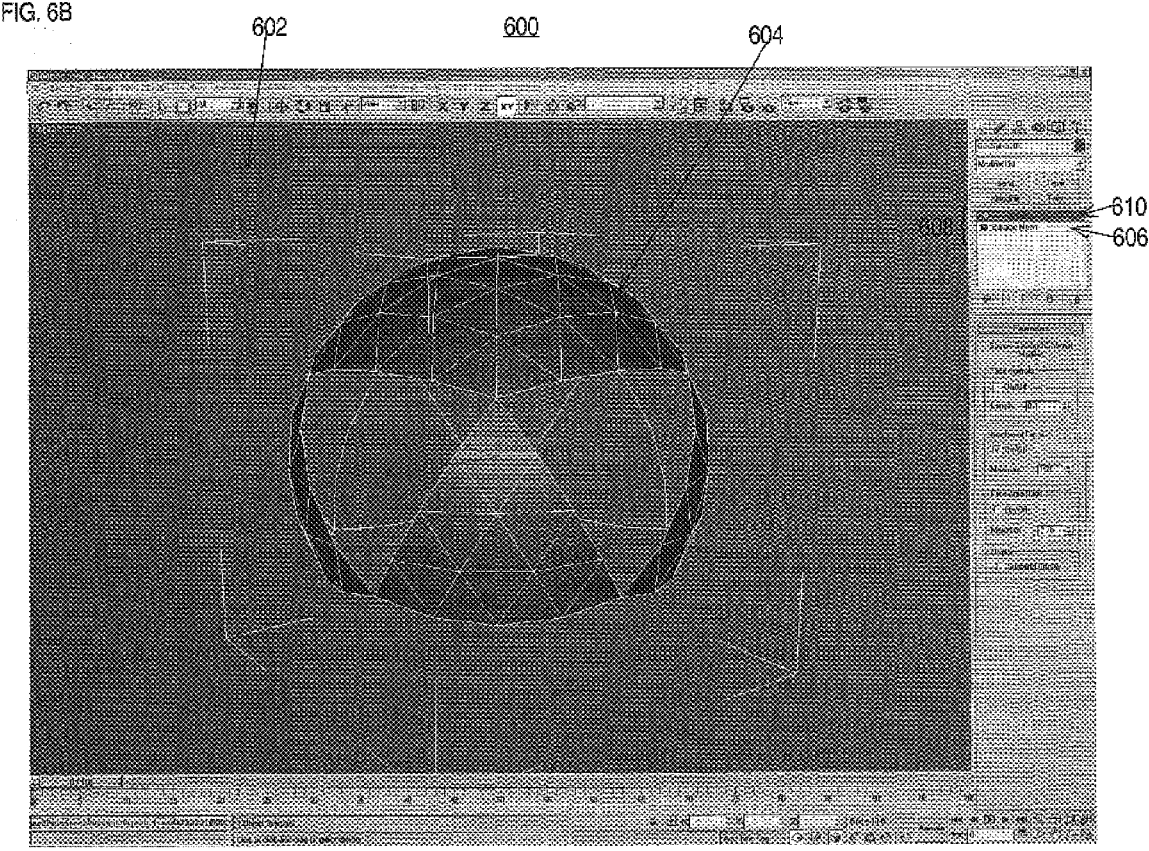
FIG. 6B further illustrates a technique for collapsing a modifier stack.
Figure 6C:
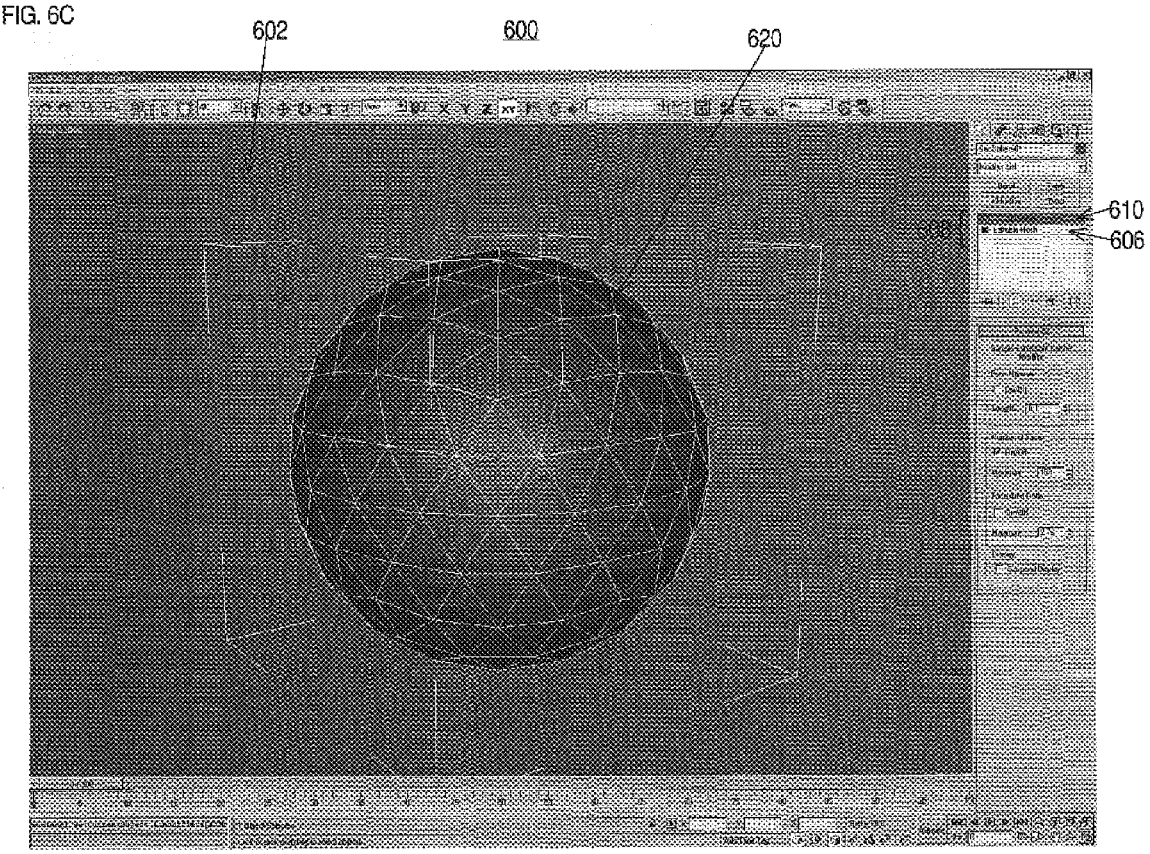
FIG. 6C further illustrates a technique for collapsing a modifier stack.

In certain situations, a user may want to collapse the modifier stack to generate a single editable geometry object that includes the modifications that were defined within the modifier stack. However, a potential drawback with collapsing the modifier stack that includes one or more XTC Objects is that the XTC Objects can adversely affect the editable object that is generated from collapsing the modifier stack. For example, as depicted in FIG. 6A, a user may interact with user interface window 600 to define a base object 606 in stack 608 to create a sphere object 604 as depicted in display window 602. Next, as depicted in FIG. 6B, the user may interact with user interface window 600 to define and insert into stack 608 an XModifier 610 that attaches an XTC Object to the geometry object that will limit the number of faces in the sphere object 604 to "159". Thus, if the modifier stack is collapsed at this point with the XTC Object still active, the editable geometry object that is created will only contain "159" faces as the other face information will be lost when the modifier stack is collapsed. To address this issue, in certain embodiments, XTC Objects are notified when a modifier stack is about to be collapsed. In response to the notification, the XTC Object can disable itself so that the XTC Object does not influence the editable geometry object that is created by collapsing the modifier stack. For example, FIG. 6C illustrates an editable object 620 that was generated in response to collapsing stack 608. As depicted, although Xmodifier 610 had previously attached an XTC Object to the geometry object, because the XTC Object disabled itself prior to the collapsing of modifier stack 608, the resulting editable object 620 includes all of its faces.

Figure 6D:
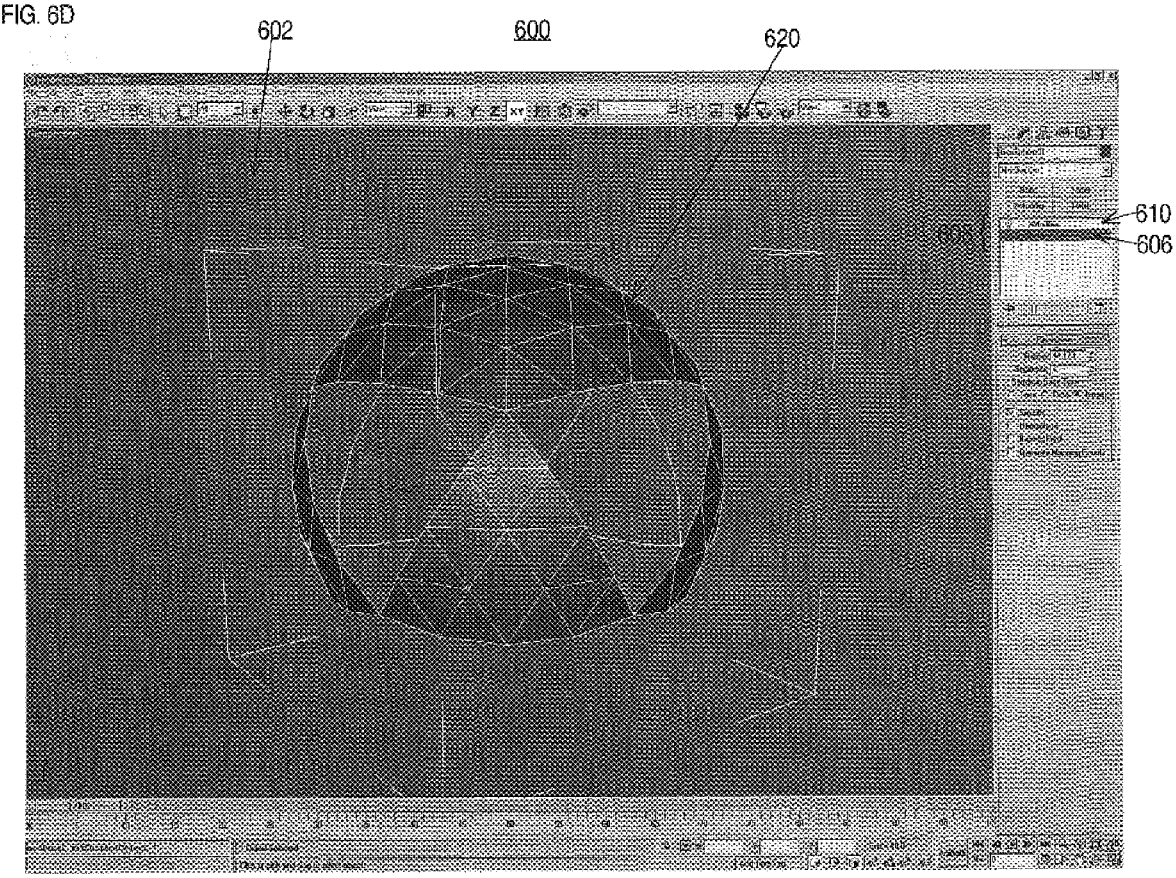
FIG. 6D further illustrates a technique for collapsing a modifier stack.

In certain embodiments, XTC Objects are notified after a modifier stack has been collapsed. In response to the notification, the XTC Objects may re-enable themselves so that they again influence the editable geometry object that is created by collapsing the modifier stack. For example, FIG. 6D illustrates an editable object 620 after the XTC Object was notified that the modifier stack 608 had been collapsed and in response re-enabled the "159" face limit.

Although FIGS. 6A through 6D illustrate a method for collapsing a modifier stack that includes an Xmodifier 610, the described technique can also be applied to a modifier stack that contains a base object that is associated with an XTC Object (for example, XGeoSphere 424 in FIG. 4A). For example, referring back to FIG. 4A, in certain embodiments, XGeoSphere 224 may receive pre and post collapse notifications. for the collapsing of stack 214. In response to the pre-collapse notification, the XTC object of XGeoSphere 424 is disabled. Thereafter, in response to the post-collapse notification, a new Xmodifier is generated and inserted into the modifier stack 214 directly after the editable mesh. The new Xmodifier attaches a new XTC object to the modifier stack that is a copy of the original XTC object that was associated with the XGeoSphere 424.

Merging XTC Objects

In certain situations, a modifier stack may contain multiple branches that include two or more XTC objects that are configured to influence a single base geometry object. In certain cases, the two or more XTC objects may be associated with attributes that are of a different type (e.g., friction values, face size limits, face number limits, etc.). For example, one branch may include a first XTC object that requires a friction value of "10" to be associated with fifty-percent of the faces that are displayed for the geometry object while a second branch includes a second XTC object that limits the number of faces that are displayed to one hundred ("100"). In one embodiment, a user may select a particular order for which inputs from multiple branches that contain XTC objects of different types are to be evaluated and applied to the geometry object. For example, the user may select to first apply the XTC object that limits the number of faces that are displayed to one hundred ("100") and to secondly apply the XTC object that requires a friction value of "10" to be associated with fifty-percent of the faces applied second.

In certain cases, the two or more XTC objects may be associated with attributes that are of the same type. For example, a first branch may include a first XTC object that requires a friction value of "10" to be associated with the faces of the object while a second XTC object that requires a friction value of "4" to be associated with the faces of the object. In certain embodiments, XTC objects having attributes of the same type are merged to form a single XTC object. The single XTC object is then applied to the geometry object as the geometry object is propagated up the modifier stack. For example, the first and second XTC objects may be merged to generate a "merged" XTC object that requires a friction value of "7" (i.e., average of friction values of "10" and "4") to be associated with the faces of the object. This merged XTC object may be attached to the geometry object as the geometry object is propagated up the modifier stack to cause a friction value of "7" to be associated with the faces of the geometry object.

In certain embodiments, when two or more XTC objects include a set of conflicting constraints and/or attributes, the stack extension mechanism may employ a variety of different arbitration schemes to determine how the conflicts are to be resolved. For example, the arbitration scheme may average the constraints and/or attributes (i.e., apply a friction value of "7"). Alternatively, the arbitration scheme may select an XTC object as the dominant object and thus apply only it's the XTC object's constraints and/or attributes. In one embodiment, the user may select a specific arbitration scheme for applying to conflicting XTC object constraints and/or attributes.

In certain embodiments, although the user may override the default settings, XTC objects having similar attribute types as well as XTC objects having dissimilar attribute types, and which are associated with different branches of a modifier stack, are by default not merged into a single XTC object, but instead separately applied to the geometry object.

The following is an example of three methods that may be used to overwrite a default behavior of two XTC objects and to merge the XTC objects together into the same class.

virtual bool RemoveXTCObjectOnMergeBranches (Object *obFrom, Object *obTo);
virtual bool MergeXTCObject(Object *obFrom, Object *obTo, int prio, int branchID);
virtual bool RemoveXTCObjectOnBranchDeleted(Object *ComObj,int branchID, bool branchWillBeReordered);

Hardware Overview

Figure 7:
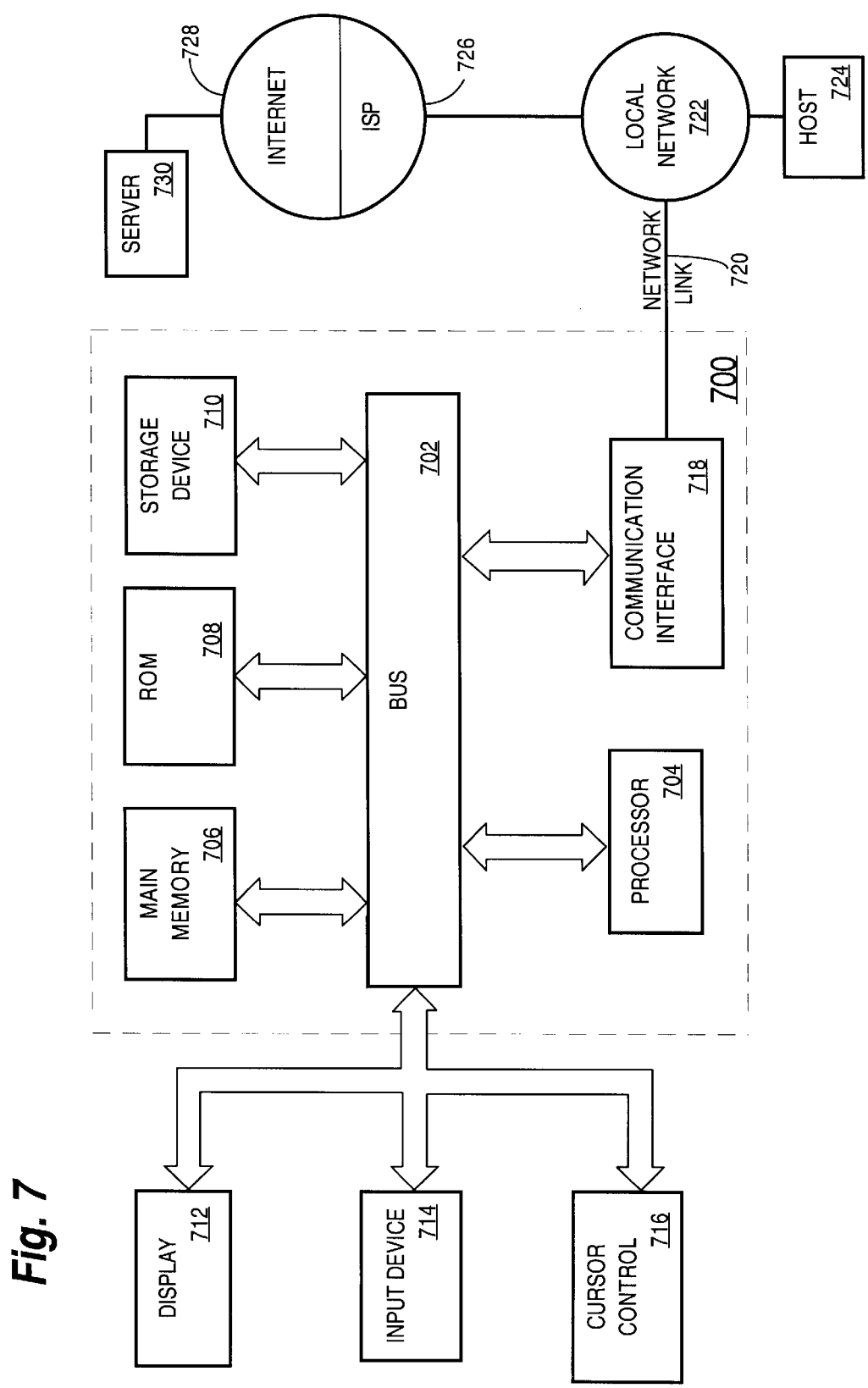
FIG. 7 is a block diagram of a computer system with which an embodiment may be carried out.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing extension channels within a modifier stack. According to one embodiment of the invention, the implementation of extension channel modifiers within a modifier stack is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for implementing extension channel modifiers within a modifier stack as described herein.

The received code may be executed by processor 704 as it is received, and/or stored in storage device 710, or other non-volatile storage for later execution. In this manner, computer system 700 may obtain application code in the form of a carrier wave.

Alternatives, Extentsions

A data notification system is provided that allows custom data can be attached to pipeline objects that flow up a modifier stack. In describing certain embodiments of the invention, several drawing figures have been used for explanation purposes. However, the invention is not limited to any particular context as shown in drawing figures, and the scope of the invention includes other contexts and applications in which the mechanisms and processes described herein is available to other mechanisms, methods, programs, and processes. For example, although examples have illustrated the use of Xmodifiers in conjunction with bend and taper modifiers, the bend and taper modifiers are used for explanation purposes only as embodiments of the invention are not limited to any particular type of modifier. Thus, the specification and drawings are, accordingly, to be regarded in an illustrative rather than a restrictive sense. Therefore, the invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for generating a modified geometry object, the method comprising the computer-implemented steps of:
   producing a first result by sequentially applying to a geometry object one or more components in an ordered sequence of components;
   producing a second result by applying to the first result at least one component that follows the one or more components in the ordered sequence;
   associating an extension object with a position in the ordered sequence that precedes said at least one component; and
   based on the extension object, modifying the second result.

2. The method of claim 1, wherein the ordered sequence of components is a stack.

3. The method of claim 2, wherein the stack is a modifier stack.

4. The method of claim 2, wherein the modifier stack includes a base object and a plurality of modifiers.

5. The method of claim 1, wherein the extension object is an extension channel object, and wherein the step of associating includes the computer-implemented step of:

associating the extension channel object with the geometry object at the position in the ordered sequence.

6. The method of claim 1, further comprising the computer-implemented steps of:

associating an extension channel with the extension object; and based on the extension object, storing in the extension channel one or more parameters for the geometry object.

7. The method of claim 1, further comprising the computer-implemented steps of:

notifying the extension object that a particular event has occurred; and in response to said notifying, the extension object causing the second result to be modified.

8. The method of claim 7, wherein the step of notifying comprises the computer-implemented step of:

sending a notification to the extension object prior to applying a particular component to the geometry object.

9. The method of claim 7, wherein the step of notifying comprises the computer-implemented step of:

sending a notification to the extension object after applying a particular component to the geometry object.

10. The method of claim 1, wherein the extension object is a plug-in module and wherein the method further comprises the computer-implemented step of:

notifying the extension object that a particular event has occurred using a callback function that is associated with the plug-in module.

11. The method of claim 1, wherein the geometry object is associated with a geometry type, and wherein the method further comprises the computer-implemented steps of:

prior to associating the extension object with the position, associating a first geometry type with the geometry object; and prior to modifying the second result, changing the geometry type from the first geometry type to a second geometry type.

12. The method of claim 1, wherein the ordered sequence of components is a stack, and wherein the method further comprises the computer-implemented steps of:

generating an editable geometry object based on the stack;

prior to generating the editable geometry object, disabling the extension object; and after generating the editable geometry object, enabling the extension object.

13. The method of claim 1, further comprising the computer-implemented step of:

evaluating the extension object after applying each component of a plurality of components in the ordered sequence.

14. The method of claim 13, further comprising the computer-implemented steps of:

storing first data that describes at least one criterion that is associated with the extension object;

storing second data that describes at least one action that is associated with the at least one criterion; and as each component of the plurality of components is applied, determining whether the at least one criterion is satisfied; and when the at least one criterion is satisfied, modifying the second result based on the at least one action.

15. The method of claim 14, wherein the at least one criterion includes that a particular component of the plurality of components is going to be applied.

16. The method of claim 14, wherein the at least one criterion includes that a particular component of the plurality of components has been applied.

17. The method of claim 14, wherein the at least one criterion includes a constraint on a property of the geometry object.

18. The method of claim 1, wherein the step of modifying the second result includes the computer-implemented step of:

producing a third result based on the second result and the extension object.

19. The method of claim 1, wherein the step of modifying the second result includes the computer-implemented step of:

producing the first result based on the extension object.

20. The method of claim 1, wherein the step of modifying the second result includes the computer-implemented step of:

altering how the geometry object is displayed.

21. The method of claim 1, wherein the step of modifying the second result includes the computer-implemented step of:

including specified information when the geometry object is displayed.

22. The method of claim 1, wherein the step of modifying the second result includes the computer-implemented step of:

comparing the first result and the second result.

23. The method of claim 1, wherein the extension object is a first extension object and the position is a first position, and wherein the method further comprises the computer-implemented steps of:

producing a third result by applying to the second result at least one additional component that follows the one or more components in the order sequence;

associating a second extension object with a second position in the ordered sequence that precedes said at least one additional component; and based on the second extension object, modifying the third result.

24. The method of claim 1, wherein the extension object is a first extension object and the position is a first position, and wherein the method further comprises the computer-implemented steps of:

associating a second extension object with a second position in the ordered sequence that precedes said at least one component; and based on the second extension object, modifying the second result.

25. The method of claim 24, wherein the steps of modifying the second result based on the first extension object and modifying the second result based on the second extension object are performed according to a priority ordering of the first extension object and the second extension object.

26. The method of claim 1, wherein the step of associating the extension object with the position in the ordered sequence comprises the computer-implemented step of:

associating the extension object with the position based upon an extension component that is included in the ordered sequence.

27. The method of claim 1, wherein the step of associating the extension object with the position in the ordered sequence comprises the computer-implemented step of:

associating the extension object with the position based upon a base component in the ordered sequence.

28. A method for generating a modified geometry object, the method comprising the computer-implemented steps of:

applying an ordered sequence of components to a geometry object, wherein at least one component of the ordered sequence specifies how to modify a first result that is produced based on one or more previous components in the ordered sequence;

producing a second result by applying to the first result a first component;

after applying the first component, producing a third result based on the second result and an extension object;

producing a fourth result by applying to the third result a second component; and after applying the second component, producing a fifth result based on the fourth result and the extension object.

29. The method of claim 28, further comprising the computer-implemented step of:

associating the extension object with a position in the ordered sequence.

30. The method of claim 29, wherein the first component and second component are applied after the position in the ordered sequence.

31. A computer-readable medium carrying one or more sequences of instructions for generating a modified geometry object, wherein execution of the one or more sequences of instructions by one or more processors causes the one or more processors to perform the steps of:

producing a first result by sequentially applying to a geometry object one or more components in an ordered sequence of components;

producing a second result by applying to the first result at least one component that follows the one or more components in the ordered sequence;

associating an extension object with a position in the ordered sequence that precedes said at least one component; and based on the extension object, modifying the second result.

32. The computer-readable medium of claim 31, wherein the ordered sequence of components is a stack.

33. The computer-readable medium of claim 32, wherein the stack is a modifier stack.

34. The computer-readable medium of claim 33, wherein the modifier stack includes a base object and a plurality of modifiers.

35. The computer-readable medium of claim 31, wherein the extension object is an extension channel object, and wherein the instructions for associating further comprise instructions which, when executed by one or more processors, cause the one or more processors to carry out the step of:

associating the extension channel object with the geometry object at the position in the ordered sequence.

36. The computer-readable medium of claim 31, further comprising instructions which, when executed by the one or more processors, cause the one or more processors to carry out the steps of:

associating an extension channel with the extension object; and based on the extension object, storing in the extension channel one or more parameters for the geometry object.

37. The computer-readable medium of claim 31, further comprising instructions which, when executed by the one or more processors, cause the one or more processors to carry out the steps of:

notifying the extension object that a particular event has occurred; and in response to said notifying, the extension object causing the second result to be modified.

38. The computer-readable medium of claim 37, wherein the instructions for notifying further comprise instructions which, when executed by one or more processors, cause the one or more processors to carry out the step of:

sending a notification to the extension object prior to applying a particular component to the geometry object.

39. The computer-readable medium of claim 37, wherein the instructions for notifying further comprise instructions which, when executed by one or more processors, cause the one or more processors to carry out the step of:

sending a notification to the extension object after applying a particular component to the geometry object.

40. The computer-readable medium of claim 31, wherein the extension object is a plug-in module and further comprising instructions which, when executed by the one or more processors, cause the one or more processors to carry out the step of:

notifying the extension object that a particular event has occurred using a callback function that is associated with the plug-in module.

41. The computer-readable medium of claim 31, wherein the geometry object is associated with a geometry type, and further comprising instructions which, when executed by the one or more processors, cause the one or more processors to carry out the steps of:

prior to associating the extension object with the position, associating a first geometry type with the geometry object; and prior to modifying the second result, changing the geometry type from the first geometry type to a second geometry type.

42. The computer-readable medium of claim 31, wherein the ordered sequence of components is a stack, and further comprising instructions which, when executed by the one or more processors, cause the one or more processors to carry out the steps of:

generating an editable geometry object based on the stack;

prior to generating the editable geometry object, disabling the extension object; and after generating the editable geometry object, enabling the extension object.

43. The computer-readable medium of claim 31, further comprising instructions which, when executed by the one or more processors, cause the one or more processors to carry out the step of:

evaluating the extension object after applying each component of a plurality of components in the ordered sequence.

44. The computer-readable medium of claim 43, further comprising instructions which, when executed by the one or more processors, cause the one or more processors to carry out the steps of:

storing first data that describes at least one criterion that is associated with the extension object;

storing second data that describes at least one action that is associated with the at least one criterion; and as each component of the plurality of components is applied, determining whether the at least one criterion is satisfied; and when the at least one criterion is satisfied, modifying the second result based on the at least one action.

45. The computer-readable medium of claim 44, wherein the at least one criterion includes that a particular component of the plurality of components is going to be applied.

46. The computer-readable medium of claim 44, wherein the at least one criterion includes that a particular component of the plurality of components has been applied.

47. The computer-readable medium of claim 44, wherein the at least one criterion includes a constraint on a property of the geometry object.

48. The computer-readable medium of claim 31, wherein the instructions for modifying the second result further comprise instructions which, when executed by one or more processors, cause the one or more processors to carry out the step of:

producing a third result based on the second result and the extension object.

49. The computer-readable medium of claim 31, wherein the instructions for modifying the second result further comprise instructions which, when executed by one or more processors, cause the one or more processors to carry out the step of:

producing the first result based on the extension object.

50. The computer-readable medium of claim 31, wherein the instructions for modifying the second result further comprise instructions which, when executed by one or more processors, cause the one or more processors to carry out the step of:

altering how the geometry object is displayed.

51. The computer-readable medium of claim 31, wherein the instructions for modifying the second result further comprise instructions which, when executed by one or more processors, cause the one or more processors to carry out the step of:

including specified information when the geometry object is displayed.

52. The computer-readable medium of claim 31, wherein the instructions for modifying the second result further comprise instructions which, when executed by one or more processors, cause the one or more processors to carry out the step of:

comparing the first result and the second result.

53. The computer-readable medium of claim 31, wherein the extension object is a first extension object and the position is a first position, and further comprising instructions which, when executed by the one or more processors, cause the one or more processors to carry out the steps of:

producing a third result by applying to the second result at least one additional component that follows the one or more components in the order sequence;

associating a second extension object with a second position in the ordered sequence that precedes said at least one additional component; and based on the second extension object, modifying the third result.

54. The computer-readable medium of claim 31, wherein the extension object is a first extension object and the position is a first position, and further comprising instructions which, when executed by the one or more processors, cause the one or more processors to carry out the steps of:

associating a second extension object with a second position in the ordered sequence that precedes said at least one component; and based on the second extension object, modifying the second result.

55. The computer-readable medium of claim 54, wherein the steps of modifying the second result based on the first extension object and modifying the second result based on the second extension object are performed according to a priority ordering of the first extension object and the second extension object.

56. The computer-readable medium of claim 31, wherein the instructions for associating the extension object with the position in the ordered sequence further comprise instructions which, when executed by one or more processors, cause the one or more processors to carry out the step of:

associating the extension object with the position based upon an extension component that is included in the ordered sequence.

57. The computer-readable medium of claim 31, wherein the instructions for associating the extension object with the position in the ordered sequence further comprise instructions which, when executed by one or more processors, cause the one or more processors to carry out the step of:

associating the extension object with the position based upon a base component in the ordered sequence.

58. A computer-readable medium carrying one or more sequences of instructions for generating a modified geometry object, wherein execution of the one or more sequences of instructions by one or more processors causes the one or more processors to perform the steps of:

applying an ordered sequence of components to a geometry object, wherein at least one component of the ordered sequence specifies how to modify a first result that is produced based on one or more previous components in the ordered sequence;

producing a second result by applying to the first result a first component;

after applying the first component, producing a third result based on the second result and an extension object;

producing a fourth result by applying to the third result a second component; and after applying the second component, producing a fifth result based on the fourth result and the extension object.

59. The computer-readable medium of claim 58, further comprising instructions which, when executed by the one or more processors, cause the one or more processors to carry out the steps of:

associating the extension object with a position in the ordered sequence.

60. The computer-readable medium of claim 59, wherein the first component and second component are applied after the position in the ordered sequence.

61. A system for generating a modified geometry object, comprising:

a geometry object;

an ordered sequence of components, wherein at least one component of the ordered sequence specifies how to modify a result that is produced based on one or more components in the ordered sequence;

an extension object that is associated with a position in the ordered sequence;

wherein:

at least one component of the ordered sequence is applied to the geometry object after the position in the ordered sequence; and based on the extension object, the result is modified after applying the at least one component.

62. The system of claim 61, further comprising:

a notification mechanism that informs the extension object when one or more events have occurred; and wherein the result is modified in response to the extension object being informed by the notification mechanism.

* * * * *